US010584518B1

(12) United States Patent
Chan et al.

(10) Patent No.: US 10,584,518 B1
(45) Date of Patent: Mar. 10, 2020

(54) SYSTEMS AND METHODS FOR PROVIDING AWARENESS OF EMERGENCY VEHICLES

(71) Applicant: STATE FARM MUTUAL AUTOMOBILE INSURANCE COMPANY, Bloomington, IL (US)

(72) Inventors: Leo Chan, Normal, IL (US); Kristopher Keith Gaudin, Bloomington, IL (US); Roxane Lyons, Chenoa, IL (US); William J. Leise, Normal, IL (US); John A. Nepomuceno, Victoria (CA); Rajiv C. Shah, Bloomington, IL (US); Edward P. Matesevac, III, Normal, IL (US); Jennifer Criswell Kellett, Bloomington, IL (US); Steven C. Cielocha, Bloomington, IL (US); Jeremy Myers, Normal, IL (US); Matthew S. Megyese, Bloomington, IL (US); Jennifer L. Crawford, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 16/288,602

(22) Filed: Feb. 28, 2019

Related U.S. Application Data

(62) Division of application No. 15/482,472, filed on Apr. 7, 2017, now Pat. No. 10,233,679.

(Continued)

(51) Int. Cl.
*E05B 77/54* (2014.01)
*B60Q 9/00* (2006.01)
(Continued)

(52) U.S. Cl.
CPC .............. *E05B 77/54* (2013.01); *B60Q 1/525* (2013.01); *B60Q 9/006* (2013.01); *B60Q 9/008* (2013.01);
(Continued)

(58) Field of Classification Search
CPC ..... E05B 77/54; E05B 81/64; G07C 9/00309; G07C 9/00174; G01S 13/931; G08G 1/16;
(Continued)

(56) References Cited

U.S. PATENT DOCUMENTS 4,864,298 A 9/1989 Dombrowski
5,828,299 A 10/1998 Chen
(Continued)

OTHER PUBLICATIONS

An Introduction to the Highway Safety Manual, American Association of State Highway and Transportation Officials, downloaded from the Internet at <http://www.highwaysafetymanual.org/Pages/default.aspx> (publicly available as of the filing date of the application).

(Continued)

*Primary Examiner* — Brian E Miller
(74) *Attorney, Agent, or Firm* — Marshall, Gerstein & Borun LLP

(57) ABSTRACT

An automatic alarm system for a vehicle includes a sensor adapted to detect electromagnetic data, a computer system, and an automatic alarm mechanism. The computer system receives data from the sensor. A computer process analyzes the data from the sensor to determine whether a pattern from the electromagnetic data has been detected, accesses a library of known patterns of electromagnetic data emitted by emergency vehicles, and compares the pattern of electromagnetic data detected by the sensor with the known patterns of electromagnetic data emitted by emergency vehicles that are stored in the library. The automatic alarm mechanism activates in response to the processor determining that the comparison matches a known pattern of electromagnetic data for an emergency vehicle resulting in the computer processor sending a first signal to activate an alarm.

20 Claims, 13 Drawing Sheets

Related U.S. Application Data

(60) Provisional application No. 62/399,803, filed on Sep. 26, 2016, provisional application No. 62/340,302, filed on May 23, 2016, provisional application No. 62/321,005, filed on Apr. 11, 2016, provisional application No. 62/321,010, filed on Apr. 11, 2016.

(51) Int. Cl.

| | |
|---|---|
| *E05B 81/64* | (2014.01) |
| *G07C 9/00* | (2020.01) |
| *G08G 1/16* | (2006.01) |
| *B60R 25/10* | (2013.01) |
| *B60Q 1/52* | (2006.01) |
| *G01S 13/931* | (2020.01) |

(52) U.S. Cl.
CPC .......... *B60R 25/1004* (2013.01); *E05B 81/64* (2013.01); *G01S 13/931* (2013.01); *G07C 9/00174* (2013.01); *G07C 9/00309* (2013.01); *G08G 1/16* (2013.01); *B60R 2025/1013* (2013.01)

(58) Field of Classification Search
CPC ........ B60Q 9/006; B60Q 1/525; B60Q 9/008; B60R 2025/1013; B60R 25/1004
See application file for complete search history.

(56) References Cited

U.S. PATENT DOCUMENTS

| | | | |
|---|---|---|---|
| 6,161,641 A | 12/2000 | Fukumura et al. | |
| 6,632,138 B1 | 10/2003 | Serizawa et al. | |
| 6,744,349 B1 | 6/2004 | Asakura et al. | |
| 6,922,624 B2 | 7/2005 | Isaji et al. | |
| 8,805,707 B2 | 8/2014 | Schumann, Jr. et al. | |
| 8,938,337 B2 | 1/2015 | Nakakura et al. | |
| 8,954,340 B2 | 2/2015 | Sanchez et al. | |
| 9,151,995 B2 | 10/2015 | Tseng et al. | |
| 9,396,599 B1 | 7/2016 | Malhotra | |
| 9,514,629 B2 | 12/2016 | Chen et al. | |
| 9,558,520 B2 | 1/2017 | Peak et al. | |
| 9,587,952 B1 | 3/2017 | Slusar | |
| 9,723,469 B2 | 8/2017 | Truong et al. | |
| 9,734,685 B2 | 8/2017 | Fields et al. | |
| 9,762,601 B2 | 9/2017 | Truong et al. | |
| 9,816,827 B1 | 11/2017 | Slusar | |
| 9,845,048 B1 | 12/2017 | Tseng et al. | |
| 10,019,904 B1 | 7/2018 | Chan et al. | |
| 10,026,309 B1 | 7/2018 | Nepomuceno et al. | |
| 10,233,679 B1* | 3/2019 | Chan ................. | G07C 9/00309 |
| 2001/0021667 A1 | 9/2001 | Fujimoto et al. | |
| 2009/0002141 A1 | 1/2009 | Rinaldi | |
| 2009/0189373 A1 | 7/2009 | Schramm et al. | |
| 2011/0161116 A1 | 6/2011 | Peak et al. | |
| 2011/0213628 A1 | 9/2011 | Peak et al. | |
| 2011/0260848 A1 | 10/2011 | Rodriguez Barros et al. | |
| 2012/0065858 A1 | 3/2012 | Nickolaou et al. | |
| 2012/0123806 A1 | 5/2012 | Schumann, Jr. et al. | |
| 2012/0135382 A1 | 5/2012 | Winston et al. | |
| 2012/0166229 A1 | 6/2012 | Collins et al. | |
| 2012/0194356 A1 | 8/2012 | Haines et al. | |
| 2012/0224062 A1 | 9/2012 | Lacoste et al. | |
| 2012/0236319 A1 | 9/2012 | Gotou et al. | |
| 2012/0326889 A1* | 12/2012 | Kabler ................. | G01S 7/022 340/905 |
| 2013/0147638 A1 | 6/2013 | Ricci | |
| 2013/0214939 A1* | 8/2013 | Washlow ................. | G01S 7/003 340/901 |
| 2013/0219318 A1 | 8/2013 | Schreiber et al. | |
| 2014/0005907 A1 | 1/2014 | Bajpai | |
| 2014/0097957 A1* | 4/2014 | Breed ................. | G08B 21/06 340/576 |
| 2014/0118130 A1 | 5/2014 | Chang et al. | |
| 2014/0276090 A1 | 9/2014 | Breed | |
| 2014/0350970 A1 | 11/2014 | Schumann, Jr. et al. | |
| 2015/0104071 A1 | 4/2015 | Martin et al. | |
| 2015/0106010 A1 | 4/2015 | Martin et al. | |
| 2015/0192660 A1* | 7/2015 | Dickow ................. | G08G 1/096783 340/902 |
| 2015/0197248 A1 | 7/2015 | Breed et al. | |
| 2015/0198951 A1 | 7/2015 | Thor et al. | |
| 2015/0203035 A1 | 7/2015 | Watanabe | |
| 2016/0006922 A1* | 1/2016 | Boudreau ................. | H04N 5/23206 348/207.1 |
| 2016/0009252 A1 | 1/2016 | Jeong | |
| 2016/0068156 A1 | 3/2016 | Horii | |
| 2016/0071418 A1 | 3/2016 | Oshida et al. | |
| 2016/0163217 A1 | 6/2016 | Harkness | |
| 2016/0259341 A1 | 9/2016 | High et al. | |
| 2016/0362118 A1 | 12/2016 | Mollicone et al. | |
| 2016/0373473 A1 | 12/2016 | Truong et al. | |
| 2017/0028907 A1 | 2/2017 | Chen | |
| 2017/0132914 A1 | 5/2017 | Dannat et al. | |
| 2017/0138108 A1 | 5/2017 | Kothari | |
| 2017/0174221 A1 | 6/2017 | Vaughn et al. | |
| 2017/0218678 A1 | 8/2017 | Kothari | |
| 2017/0235305 A1 | 8/2017 | Jung et al. | |
| 2017/0236416 A1 | 8/2017 | Dannat et al. | |
| 2017/0334459 A1 | 11/2017 | McNew | |
| 2017/0371339 A1 | 12/2017 | Charette et al. | |
| 2018/0032071 A1* | 2/2018 | Wieneke ................. | G05D 1/0027 |
| 2018/0072271 A1 | 3/2018 | Yiwei et al. | |
| 2018/0081357 A1 | 3/2018 | Datta Gupta et al. | |
| 2018/0233047 A1* | 8/2018 | Mandeville-Clarke ................. B62D 15/0255 | |

OTHER PUBLICATIONS

Fingas, Waze warns you about dangerous intersections in big US cities, downloaded from the Internet at: <https://www.engadget.com/2016/03/23/waze-warns-about-dangerous-intersections/> (Mar. 23, 2016).

Highway Performance Monitoring System Traffic Data for High Volume Routes: Best Practices and Guidelines Final Report (Sep. 8, 2004).

Roadway Information Database (RID), Iowa State University, Center for Transportation Research and Education, downloaded from the Internet at: <http://www.ctre.iastate.edu/shrp2-rid/rid.cfm> (2014).

Sayed et al., Evaluating the Safety Benefits of the Insurance Corporation of British Columbia Road Improvement Program using a Full Bayes Approach, Transportation Research Board 2016 Annual Meeting (Nov. 15, 2015).

Shah, Accident Heat Map for Chicago (2015).

Map of Detroit—Claims at Intersections (May 2018).

hyundai-debuts-new-safe-exit-assist-system-to-keep-passengers-from-opening-car-doors-too-soon; title: "Hyundai Debuts New Safe Exit Assist System to Keep Passengers from Opening Car Doors Too Soon", Author: Marie Donlon, Jul. 11, 2018; 2 pages. Year: 2018), <https://insights.globalspec.com/article/9271/>.

\* cited by examiner

SYSTEMS AND METHODS FOR PROVIDING AWARENESS OF EMERGENCY VEHICLES

CROSS-REFERENCE TO RELATED APPLICATIONS

This is a divisional of U.S. patent application Ser. No. 15/482,472, entitled "Systems and Methods for Control Systems to Facilitate Situational Awareness of a Vehicle" and filed Apr. 7, 2017, which claims the benefit of U.S. Provisional Patent Application No. 62/321,005, entitled "Device for Detecting and Visualizing High-Risk Intersections and Other Areas" and filed Apr. 11, 2016; U.S. Provisional Patent Application No. 62/321,010, entitled "Analyzing Auto Claim and Vehicle Collision Data to Identify Hazardous Areas and Reduce Vehicle Collisions" and filed on Apr. 11, 2016; U.S. Provisional Patent Application No. 62/340,302, entitled "Analyzing Auto Claim and Vehicle Collision Data to Identify Hazardous Areas and Reduce Vehicle Collisions" and filed May 23, 2016; and U.S. Provisional Patent Application No. 62/399,803, entitled "Systems and Methods for Control Systems to Facilitate Situational Awareness of a Vehicle" and filed Sep. 26, 2016. The disclosure of each of the above-identified applications is expressly incorporated by reference herein in its entirety.

TECHNICAL FIELD

The present disclosure relates generally to facilitating situational awareness for vehicles which may result in the vehicle occupants becoming more aware of their immediate surroundings. More particularly, the present disclosure relates to an automatic door-locking system for a stationary vehicle that has an approaching cyclist or pedestrian and an alarm system to alert vehicle occupants of an approaching emergency vehicle(s).

BACKGROUND

Vehicle occupants including but not limited to the driver are often partially or completely unaware of their immediate surroundings exterior to their vehicle. Some examples that cause vehicle occupants to behave in this manner are the use of mobile phones or listening to the radio with the volume very high. Blind spots, not being able to recall driving directions, ground unawareness, and other factors and distractions contribute to and/or exacerbate the impairment to situational awareness vehicle occupants. Vehicle occupants that are not situationally aware or attentive to what is going on exterior to their vehicle cannot only create dangers for themselves and their vehicle, but also create danger for those persons and objects outside of the vehicle. This type of behavior by vehicle occupants can result in injuries (and, in worst case scenarios, fatalities) to themselves and/or those outside of the vehicle as well as damage to their vehicle and property outside of the vehicle. The present disclosure may provide solutions for some scenarios in which the lack of situational awareness and attention by vehicle occupants creates danger for themselves and those exterior to the vehicle.

SUMMARY

The present embodiments disclose systems and methods that relate to, inter alia, facilitating situational awareness of a vehicle when certain scenarios exterior to the vehicle arise. Exemplary systems and methods may use data received from sensors to determine if the vehicle needs to take autonomous action in order to create a safer environment for the vehicle occupants as well as for those exterior to the vehicle. In accordance with this exemplary aspect of the invention, a method implemented on a computer system for a vehicle to take autonomous action in order to prevent injury and/or damage to the vehicle and its occupants as well as those persons and objects exterior to the vehicle. Examples of autonomous actions may be automatically locking the doors of the vehicle and/or generating an alert or alarm inside the vehicle.

Different types of sensors may be used. These sensors may be used to detect motion, velocity, proximity, light, or sound. Some sensors may be used to detect more than one characteristic (e.g., motion, velocity, and proximity). These sensors may be actively detecting exterior to the vehicle while the vehicle is stationary and when the vehicle is in motion. Objects in motion (e.g., cyclists, pedestrians) approaching the vehicle while the vehicle is stationary may be detected. Additionally, emergency vehicles in the vicinity of the vehicle while the vehicle is stationary or moving may also be detected.

In one aspect, an automatic alarm system for a vehicle includes a sensor adapted to detect electromagnetic data, and a computer system adapted to: (1) receive data from the sensor; (2) analyze, by a computer processor, the data from the sensor to determine whether a pattern from the electromagnetic data has been detected; (3) access, by the computer processor, a library of known patterns of electromagnetic data emitted by emergency vehicles; and/or (4) compare, by the computer processor, the pattern of electromagnetic data detected by the sensor with the known patterns of electromagnetic data emitted by emergency vehicles that are stored in the library. The automatic alarm system also includes an automatic alarm mechanism that activates in response to the processor determining that the comparison matches a known pattern of electromagnetic data for an emergency vehicle resulting in the computer processor sending a first signal to activate an alarm.

In another aspect, a method includes: (1) detecting electromagnetic data using a sensor; (2) receiving, by a computer system, data from the sensor; (3) analyzing, by a computer processor, the data from the sensor to determine whether a pattern from the electromagnetic data has been detected; (4) accessing, by the computer processor, a library of known patterns of electromagnetic data emitted by emergency vehicles; (5) comparing, by the computer processor, the pattern of electromagnetic data detected by the sensor with the known patterns of electromagnetic data emitted by emergency vehicles that are stored in the library; and/or (6) activating an automatic alarm mechanism in response to the computer processor determining that the comparison matches a known pattern of electromagnetic data for an emergency vehicle, at least in part by the computer processor sending a first signal to activate an alarm.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent numerals.

DETAILED DESCRIPTION

Figure 1:
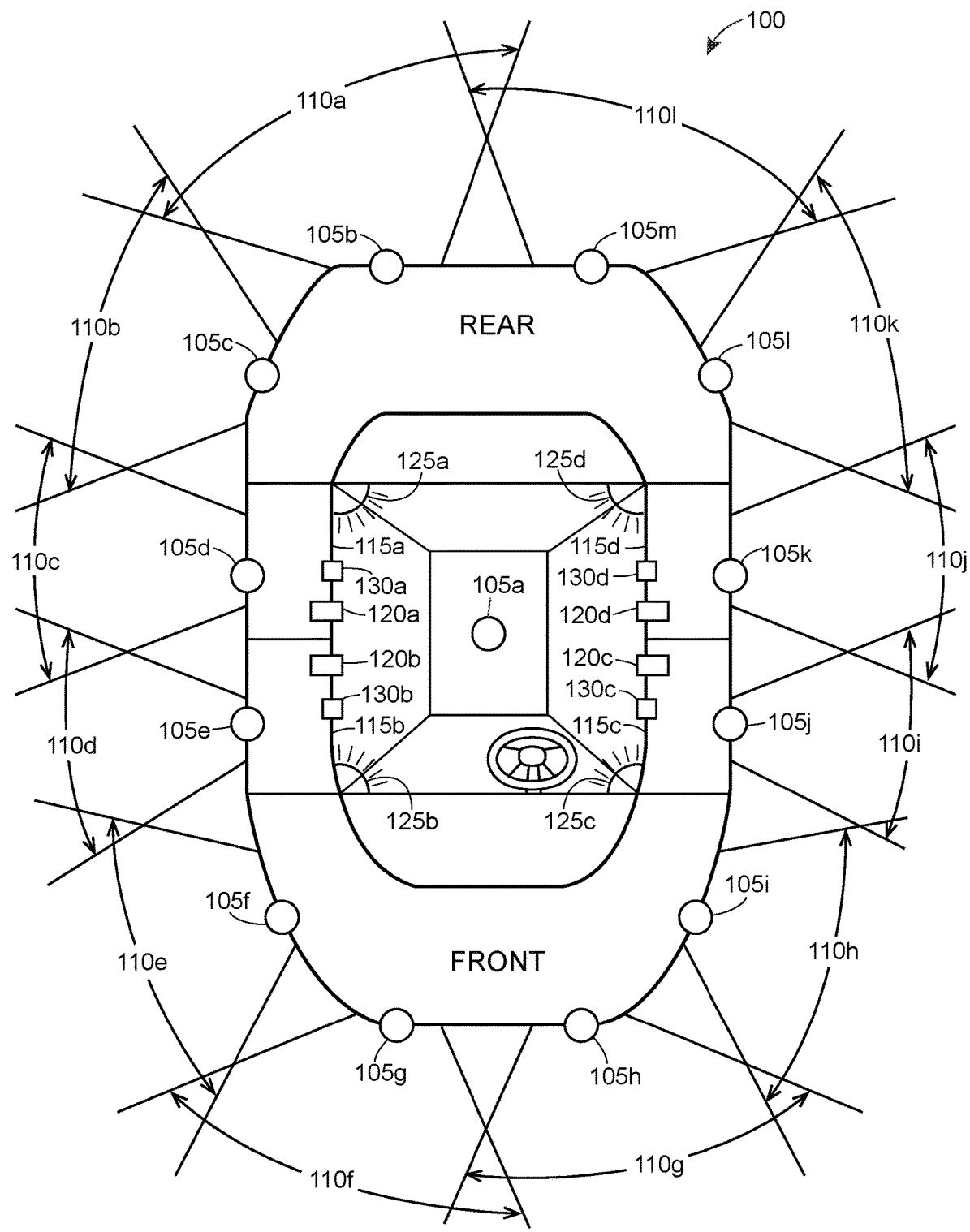
FIG. 1 depicts an exemplary top view of a vehicle with sensors for an automatic door-locking system while a vehicle is stationary.

An automatic door-locking system uses motion sensors to detect movement of objects exterior to the vehicle. In particular, objects moving toward, and within the proximity of the vehicle are a concern for this implementation. An object may be moving toward the vehicle from any direction at velocity. If the combination of a vehicle door opening, and the proximity and velocity of approaching object poses a potentially dangerous situation for the object and/or the occupants of the vehicle, the doors of the vehicle may automatically lock in order to prevent this dangerous situation from happening, specifically, from a door being opened by the occupants of the vehicle which would result in a collision with the approaching object.

An example of such a dangerous situation could be a bicyclist riding towards the stationary vehicle. If a door of the vehicle that is on the same side as the bicyclist is opened and the bicyclist collides with the door of the vehicle, the bicyclist and/or a vehicle occupant could be injured. An automatic door-locking system may prevent this type of collision from occurring.

More specifically, motion sensors may be located all around the vehicle. In one embodiment, one or more motion sensors that detect a moving object may send a signal to a computer system on the vehicle to temporarily lock all of the doors in the vehicle.

In another embodiment, there may be an array of motion sensors on the vehicle and each sensor in the array may be designated to a specific zone of the vehicle. Each zone is designated to one or more specific door locks of the vehicle. Depending on which zones have one or more motion sensors that detect the presence of a nearby moving object, specific doors of the vehicle may automatically lock. When the sensors no longer detect the presence of a nearby moving object(s), the vehicle may return the locks to their previous state.

In yet another embodiment, more sophisticated sensors (such as an image sensor) on the vehicle may detect a moving object and, based upon the data collected by the sensor, determine various characteristics such as the size of the object, the velocity of the object (which includes the speed and direction) and the distance the object (proximity) is from the vehicle. These characteristics may be analyzed individually and together and may be used to determine if one or more doors should be automatically locked, or if there is a false positive (such as a paper bag floating in the wind by the vehicle) and no action should be taken (none of the doors should be automatically locked). In some embodiments the vehicle occupants may be alerted of an approaching object in the form of a haptic, visual, or audio alert.

An automatic emergency vehicle alarm system uses one or more electromagnetic radiation sensors to detect the presence and approach of emergency vehicles. In particular, emergency vehicles moving toward the vehicle are a concern for this implementation. For example, an emergency vehicle may be moving toward the vehicle from any direction. Some drivers and other vehicle occupants may be distracted (e.g., texting or talking on a mobile phone) or unable to hear (e.g., the radio volume is too loud) the emergency vehicle so an alarm may sound inside the vehicle to alert the driver and other vehicle occupants that an emergency vehicle is nearby and approaching the vehicle. In order to make sure the audio alert (both from the approaching emergency vehicle and the alarm system of the vehicle itself) is heard by the vehicle occupants, all other audio controlled by the vehicle is temporarily muted More specifically, electromagnetic radiation sensors may be located around the vehicle. There may be different types of electromagnetic radiation sensors located around the vehicle. Emergency vehicles may be transmitters that emit a unique electromagnetic signal that is detected by advanced traffic signal detection systems which may provide priority for the approaching emergency vehicle. The electromagnetic radiation sensors may be tuned to detect the signal emitted by emergency vehicles. The sensors may also be able to detect sounds or light. The frequencies of sound and wavelengths of light that are detected by the sensors may be analyzed individually and together in order to identify certain patterns of electromagnetic data that are known to be associated with emergency vehicles. Based upon the outcome of this analysis, it may be determined that an emergency vehicle has been detected and an alarm may be activated to alert the driver that there is an emergency vehicle in the vicinity of the vehicle.

Further, in one implementation, a library of known patterns of electromagnetic data may be accessed from the memory of the computer of the vehicle, which corresponds to patterns that are known to be associated with emergency vehicles. This library of known patterns of electromagnetic data may be used to compare with the patterns of electromagnetic data determined from an analysis of the electromagnetic data from the sensors. If the electromagnetic data generated from the sensors matches a known patterns of electromagnetic data from the library, then an alarm may be activated and sounded through the speakers of the vehicle to alert the driver that there is an emergency vehicle in the vicinity of the vehicle.

Exemplary Embodiments for an Automatic Door-Locking System

As used herein, the term "vehicle" refers to any type of powered transportation device, which includes, and is not limited to, an automobile, truck, bus, or motorcycle including self-driving or autonomous vehicles. While the vehicle may normally be controlled by an operator, it is to be understood that the vehicle may be unmanned and remotely or autonomously operated in another fashion, such as using controls other than the steering wheel, gear shift, brake pedal, and accelerator pedal.

FIG. 1 is a top view of an exemplary vehicle 100 that is equipped with an automatic door-locking system. The vehicle 100 in FIG. 1 is stationary. As used herein, the term "stationary" refers to a vehicle that is in the "park" gear and not when the vehicle is stationary because the vehicle's brake is being applied (e.g. when the vehicle is stopped at a red light or a stop sign).

The vehicle 100 may have one or more sensors 105a-105m (collectively referred to as sensors 105) located around the vehicle 100. There may also be one or more zones 110a-110l (collectively referred to as zones 110) defined around the vehicle 100, and each sensor 105 may be associated with one or more zones 110. The number of sensors 105 and zones 110 are not defined by the number of sensors 105 and zones 110 depicted in FIG. 1, as there can be any number of sensors 105 and zones 110.

The vehicle 100 has one or more doors 115a-115d (collectively referred to as doors 115). Although the vehicle 100 depicted in FIG. 1 has four doors 115, other implementations may have fewer or more doors 115. Typically, each of the four doors 115 has a single door lock 120a-120d (collectively referred to as door locks 120). Each of the door locks 120 has the capability of being locked by a vehicle occupant manually using a door lock switch 130a-130d (collectively referred to as door lock switch(es) 130) or automatically if a moving object poses a potentially dangerous situation exterior to the vehicle 100.

The vehicle 100 also has one or more speakers 125a-125d (collectively referred to as speakers 125). Although the vehicle 100 depicted in FIG. 1 has four speakers 125, other implementations may have fewer or more speakers 125. The speakers 125 may be used to notify vehicle occupants that a moving object exterior to the vehicle 100 has been detected and one or more doors 115 have been locked. Additionally, the speakers 125 may also be used to notify vehicle occupants that the moving object exterior to the vehicle 100 is no longer being detected and any doors 115 that were originally unlocked but were locked as a result of the detection of the moving object have been unlocked. Other possible forms of notification to the vehicle occupants could be haptic feedback in the seat or steering wheel, flashing light, on screen display notification, heads-up display notification, audible alert or alarm, etc.

Figure 2A:
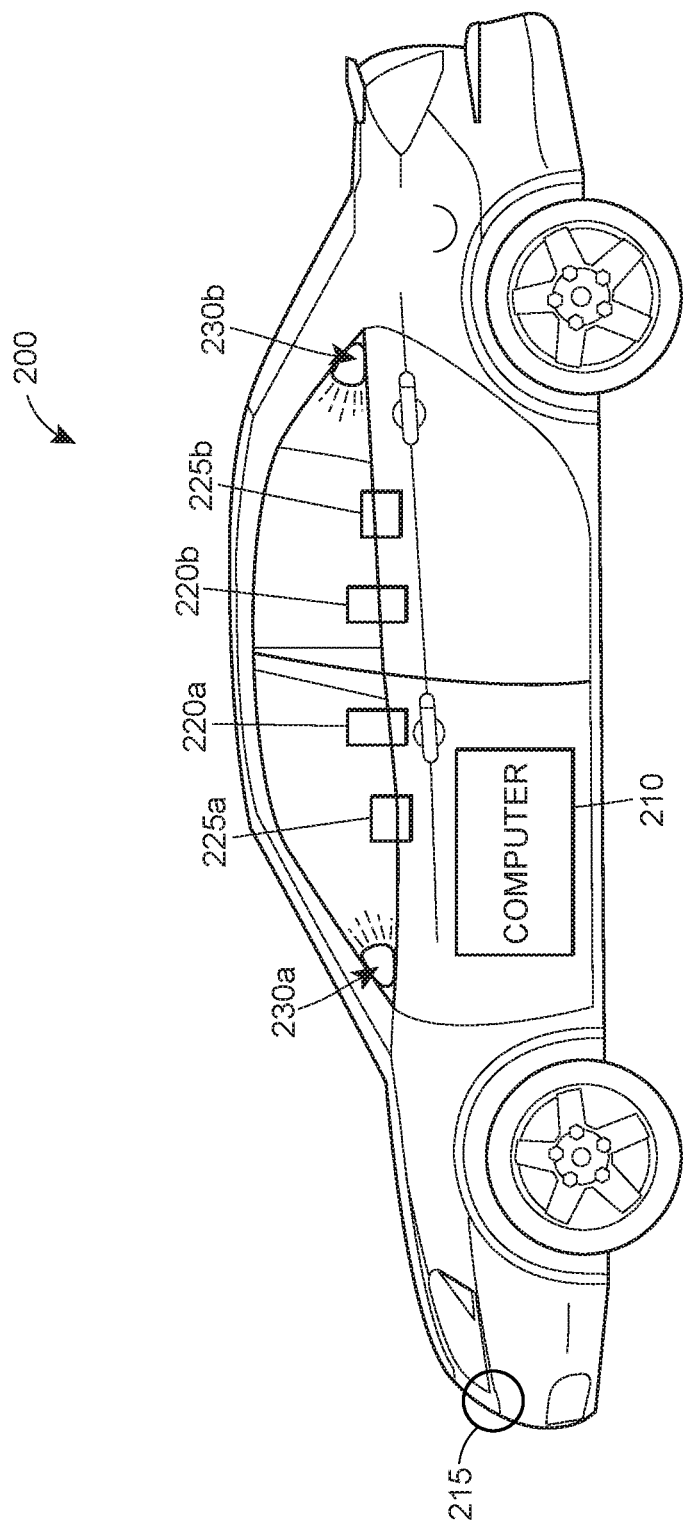
FIG. 2A depicts an exemplary side view of the vehicle with the components of the automatic door-locking system.

FIG. 2A depicts a side view of a stationary vehicle 200 that is the same as the vehicle 100 in FIG. 1. An exemplary view of the locations of the components of the automatic door-locking system is shown. In this implementation, there is a computing device 210 located in the vicinity of the center console of the vehicle 200. However, it should be understood by those of ordinary skill in the art that the computing device may be located in other parts of the vehicle 200, or as a separate device such as a mobile device (e.g., mobile phone, tablet, phablet, etc.). As disclosed further below, each computing device includes a processor and a memory. A sensor 215 is located in the front of the vehicle. There are two door locks 220a-220b (collectively referred to as door locks 220) and two door lock switches 225a-225b (collectively referred to as door lock switches 225) located on each of the two doors. There are also speakers 230a-230b (collectively referred to as speakers 230) located in the front and back of the vehicle 200.

Figure 2B:
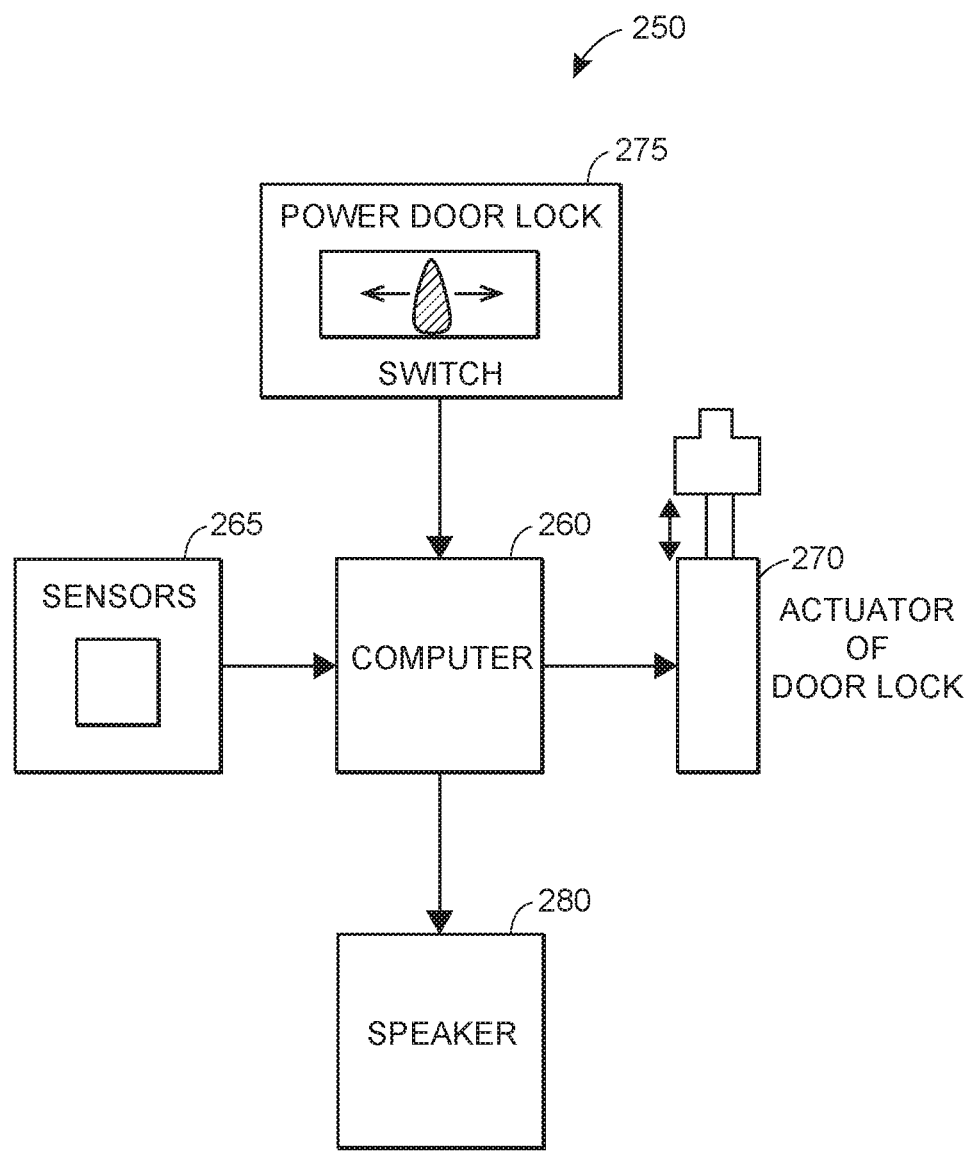
FIG. 2B depicts an exemplary block diagram of the components of the automatic door-locking system.

FIG. 2B depicts a block diagram 250 of the automatic door-locking system depicted in FIG. 2A. The computer 260 has several inputs and outputs. The sensors 265 and the door lock switches 275 connect to inputs of the computer 260. The sensors 265 send signals to the computer 260 and the computer 260 analyzes the signals to determine if a door(s) should be automatically locked or not. The door lock switches 275 also send signals to the computer when a vehicle occupant actuates the door lock switch 275 to lock or unlock a door. The computer 260 has outputs to the actuators of the door locks 270 and the speakers 280. Based upon the signals the computer 260 receives from the sensors 265 and the door lock switches 275, the computer 260 sends signals to the actuators of the door locks 270 in order for the actuators to position the door locks 270 to lock or unlock door locks.

Additionally, based upon the signals the computer 260 receives from the sensors 265 the computer 260 sends signals to the speakers 280 to either notify the vehicle occupants of a moving object in the immediate vicinity of the vehicle or to notify the vehicle occupants that there no longer is a moving object in the immediate vicinity of the vehicle. The immediate vicinity of the vehicle is the area surrounding the vehicle, and particularly the sides of the vehicle, including an area that is at least the width of the vehicle when the doors are fully opened. In other embodiments, the immediate vicinity may include the width of the vehicle when the doors are fully opened plus an additional measurement (e.g., one foot), or the vehicle's width plus the total length of the door (which would be a larger area than the width of the vehicle when the doors are fully opened.

Figure 3:
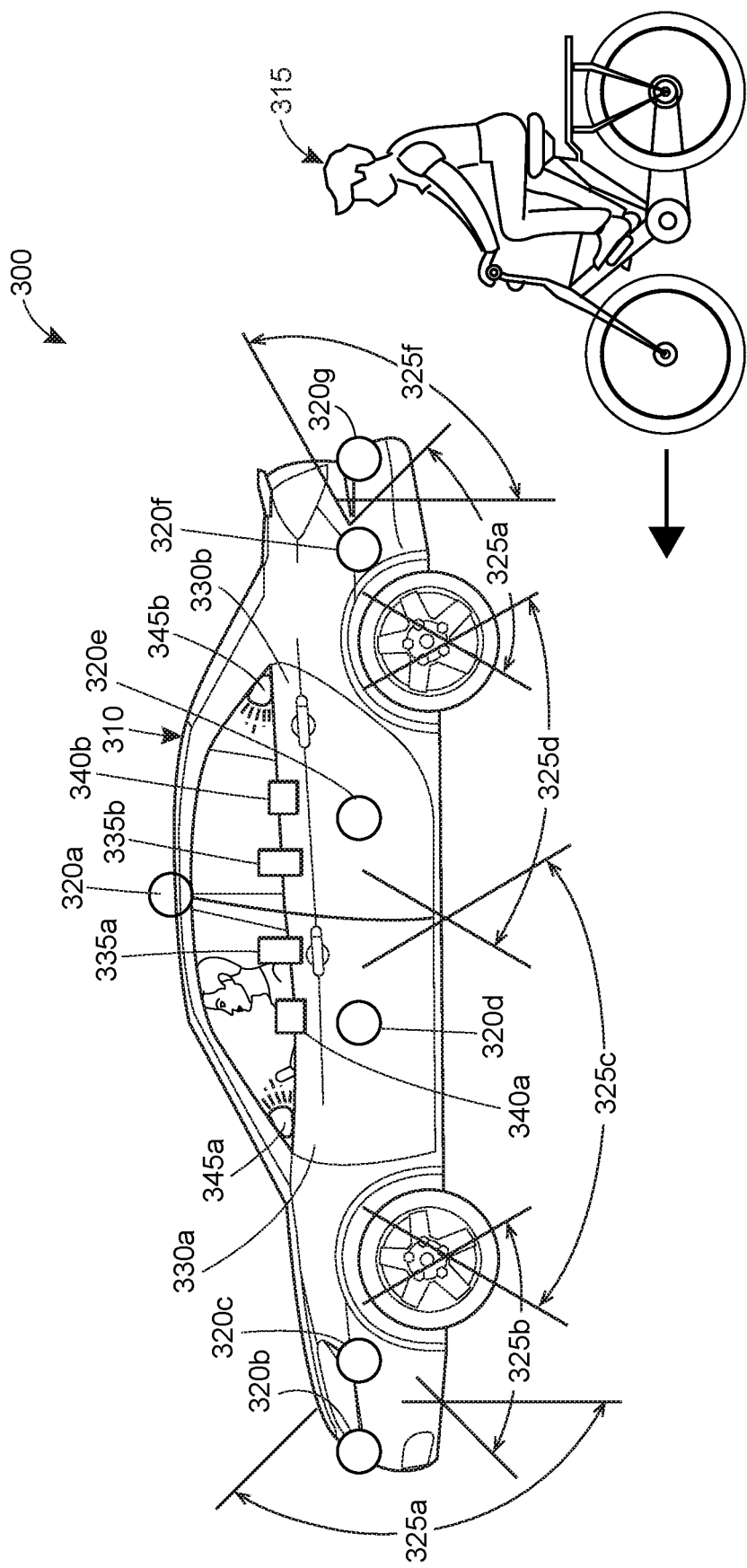
FIG. 3 depicts an exemplary side view of the vehicle sensors, and person on a bicycle moving toward the vehicle.
Figure 4A:
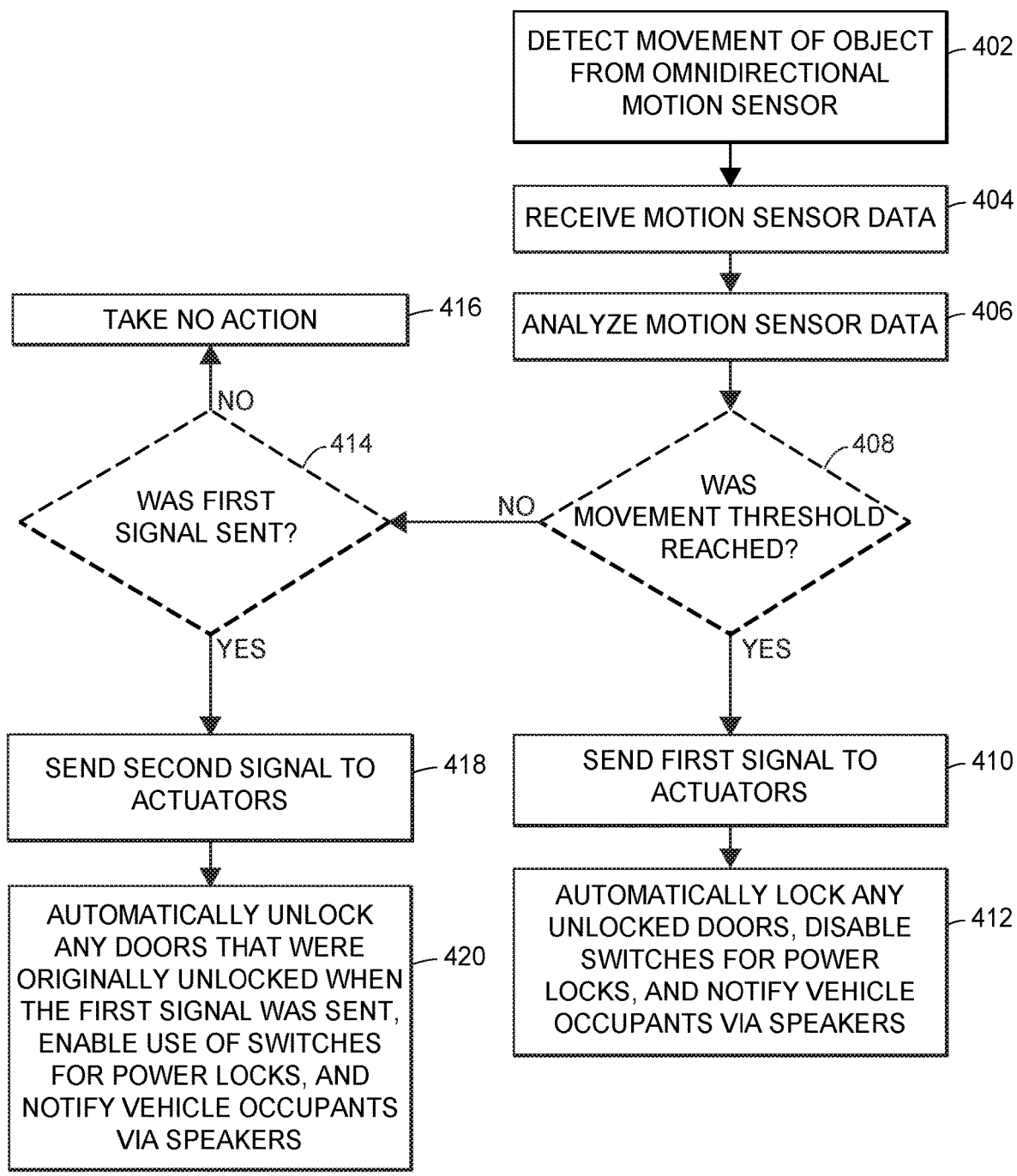
FIG. 4A-4C depict exemplary embodiments for computer-implemented methods for an automatic door-locking system while the vehicle is stationary.
Figure 4B:
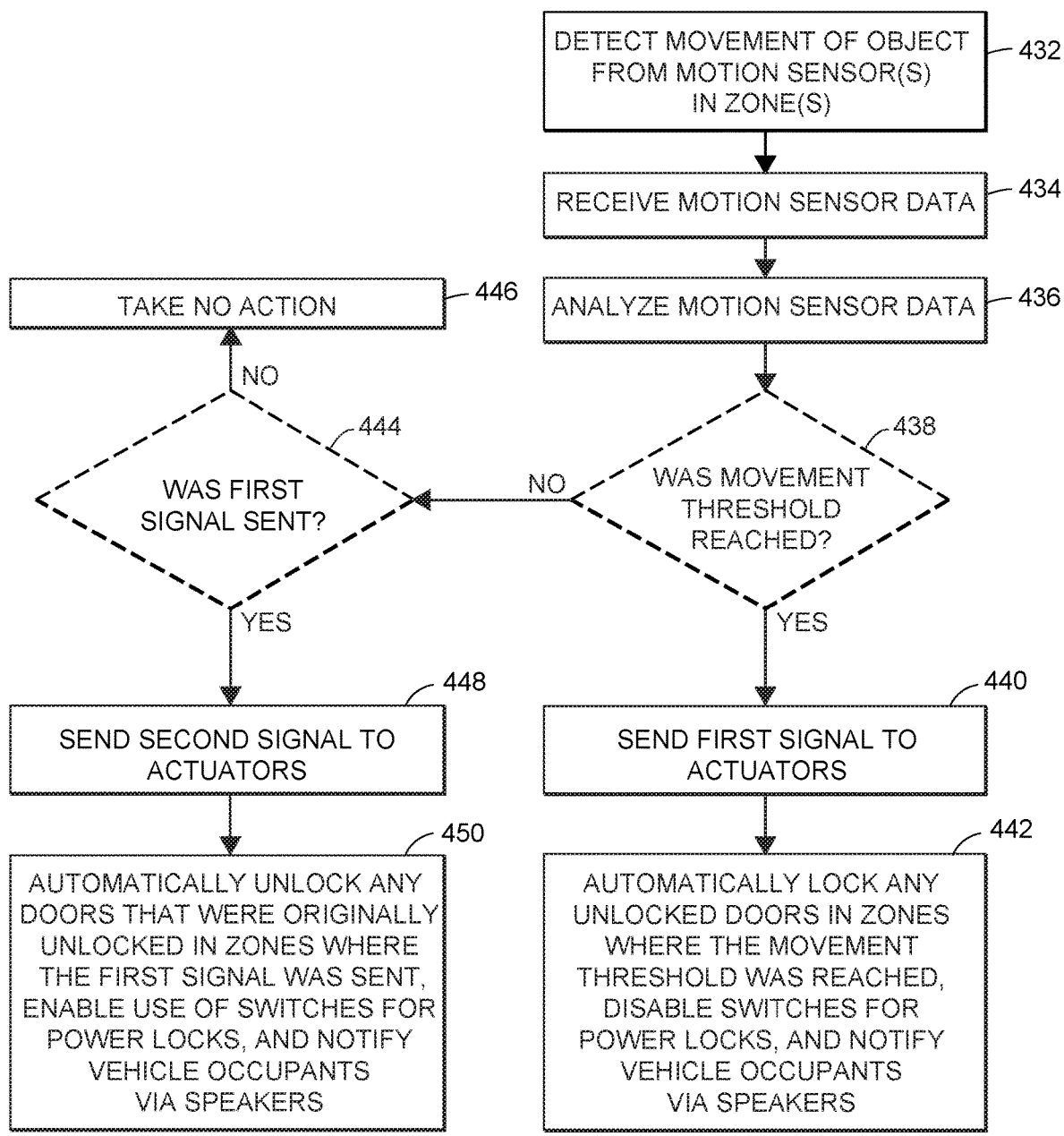
Figure 4C:
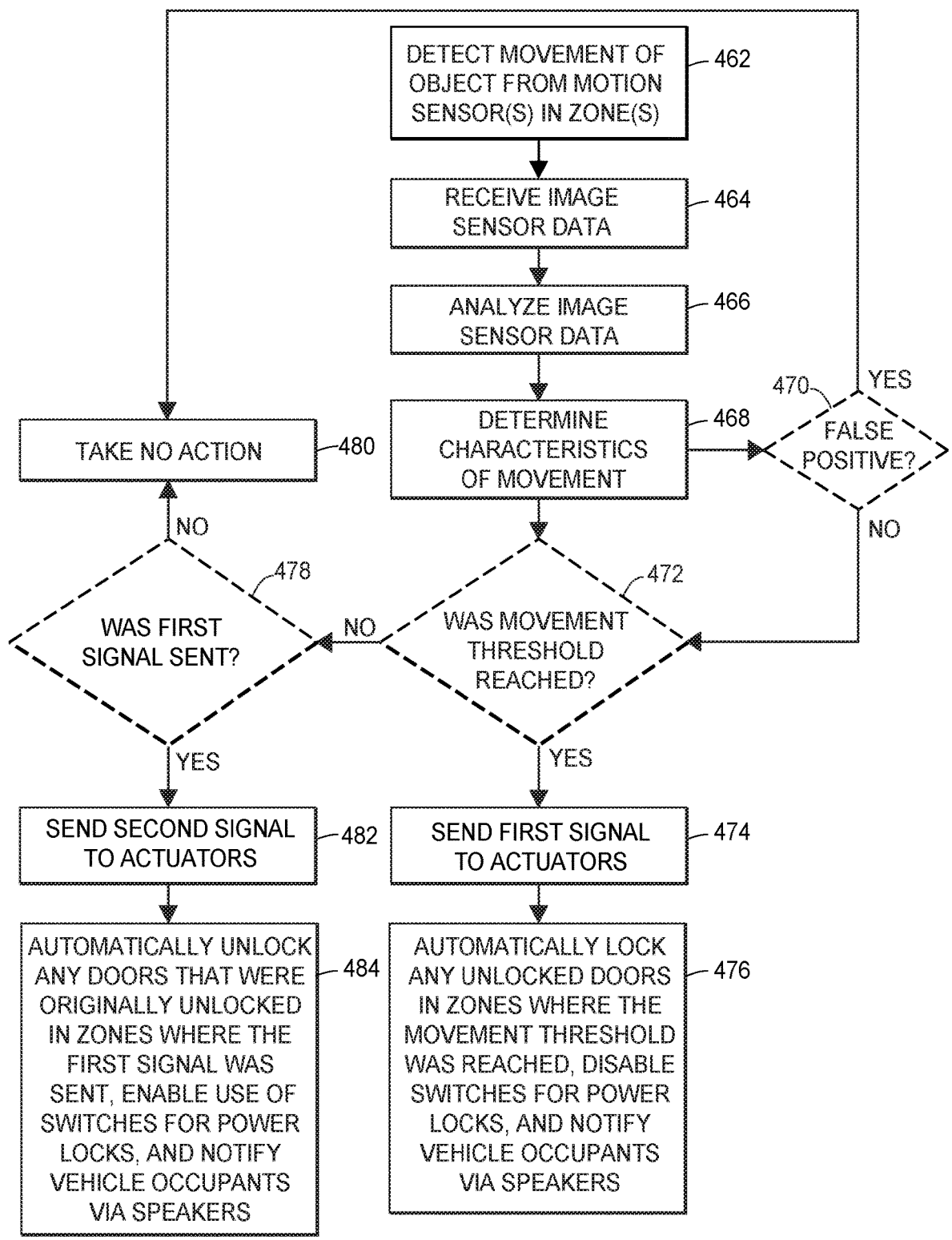

FIG. 3 is an exemplary scenario 300 with the driver's side view of a stationary vehicle 310 and a moving object 315 that will be used explain the method diagrams of FIGS. 4A-4C. In this implementation, the moving object 315 is a person riding a bicycle that is approaching the vehicle 310. This moving object 315 is approaching the vehicle 310 from the rear on the driver's side of the vehicle 310. In this example, the vehicle is similar to that depicted in FIGS. 1 and 2A. More particularly, there is an omnidirectional sensor 320a and several sensors 320b-320g located on the side of the vehicle 310. The omnidirectional sensor 320a has a 360 degree field-of-view while the sensors 320b-320g typically have less than a 180 degree field-of-view. The sensor 320b-320g are associated with several zones 325a-325f (collectively referred to as zones 325). The zones 325 are generally defined by the field-of-view the sensors 320b-320g.

As shown in FIG. 3, the zones may overlap to an extent. There are two doors 330a-330b (collectively referred to as doors 330) and one lock 335a-335b (collectively referred to as lock 335) and one door lock switch 340a-340b (collectively referred to as door lock switch 340) for each door 330. There is also one speaker 345a-345b (collectively referred to as speakers 345) each located in the front and back of the vehicle 310. Although shown as an omnidirectional sensor 320a and multiple sensors 320b-320g, the vehicle 310 may include just one omnidirectional sensor 320a and no sensors 320b-320g, just sensors 320b-320g and no omnidirectional sensor 320a, and more or fewer sensors 320b-320g than what is depicted in FIG. 3.

The doors 330 are associated with more one or more zones 325. In one example, this association is defined by the movement of the door 330 between an open position and a closed position. In FIG. 3, door 330a may only be associated with zone 325c when in the closed position. However, if door 330a is opened it may also be associated with zone 325*b* in addition to zone 325*c*. In another example, the zones 325 work to detect the movement of the moving object 315, so that a rear zone (e.g., zone 325*f*) activates the door locks 325 for the doors 330 even before the moving object 315 reaches the doors 330. Therefore, in this example, the doors 330 are associated with zone 325*f*. In yet another example, the zones 325 work together to detect a moving object 315. The sensor (e.g., sensor 320*g*) for a back zone (e.g., zone 325*f*) detects the moving object 315 that moments later is detected by an adjacent sensor (e.g., sensor 320*f*) and zone (e.g., zone 325*e*) and so on along the side of the vehicle 310 shown in FIG. 3. Along the path of the moving object 315, the door locks 325 for the doors 330 are activated as the moving object 315 passes through each zone 325 from the rear of the vehicle 310 to the front of the vehicle 310.

FIG. 4A shows a flow diagram 400 of a first embodiment of an exemplary computer-implemented method for an automatic door-locking system while a vehicle 310 is stationary. In this embodiment, an omnidirectional motion sensor 320*a* detects movement of an object 315 (block 402). The computer processor then receives the motion sensor data (block 404) and analyzes the motion sensor data (block 406). The analysis of the omnidirectional motion sensor data determines whether the object 315 is close enough to the vehicle 310 and whether the object 315 is moving towards the vehicle 310 since a moving object 315 can be moving in any direction.

Changes in the motion sensor data that the computer processor receives further indicates whether an object 315 is moving towards the vehicle 310 or not. For example if a distance value of the motion sensor data signal the computer processor receives is decreasing then that could indicate an object 315 that is moving toward the vehicle 310.

The value of the motion sensor data signal is in the form of a voltage or current signal. The distance decreases as an object gets closer to the motion sensor. Thus, the distance value represents how close the object is to the vehicle 310 (i.e., the distance the object 315 is from the vehicle 310). If this value is recorded over time, the velocity of the moving object 315 can also be determined. Once a predetermined distance and/or speed is reached, the door locks 325 of the doors 330 will activate. If the moving object 315 is close enough to the vehicle 310 and moving towards the vehicle 310 then the door locks 325 of vehicle doors 330 should automatically lock in order to prevent a dangerous situation between the vehicle door 330 and the moving object 315.

After the analysis is complete, the computer processor determines if a movement threshold has been reached (block 408). The movement threshold is met if the motion sensor data signal that the computer processor receives reaches a certain threshold value (e.g., a particular minimum distance and/or velocity). If the movement threshold has been reached (block 408) a first signal is sent by the computer 210 to the actuators (block 410) of all of the door locks 335 of the vehicle 310. This first signal will cause the actuators of all of the doors 330 to automatically lock any unlocked doors 330 of the vehicle 310, disable the switches for all of the door locks 340, and notify the vehicle occupants via the speakers 345 or other notification systems, as disclosed above, that doors 330 have been automatically locked and the switches for the door locks 340 have been disabled (block 412) in order to maintain safety inside and outside of the vehicle 310.

If the movement threshold has not been reached (block 408) and the first signal has not been sent (block 414) then no action is taken (block 416). However, if the movement threshold has not been reached (block 408) but the first signal has been sent (block 414) then a second signal is sent from the computer 210 to the actuators (block 418) of all of the door locks 335 of the vehicle. The second signal indicates that the motion sensor data signal value is now below the threshold value that caused the first signal to be sent. This second signal will cause the actuators to automatically unlock any doors 330 that were originally unlocked when the first signal was sent, enable the use of the switches for all of the door locks 340 for the vehicle occupants, and notify the vehicle occupants via the speakers 345 or other notification systems, as disclosed above, that doors 330 are no longer being automatically locked and the switches for the door locks 340 are re-enabled (block 420).

FIG. 4B shows a flow diagram 430 of a second embodiment of an exemplary computer-implemented method for an automatic door-locking system while a vehicle 310 is stationary. Motion sensors 320*b*-320*g* from different zones detect movement of an object 315 (block 432). The computer processor then receives the motion sensor data (block 434) and analyzes the motion sensor data (block 436). The analysis of the motion sensor data from the sensors 320*b*-320*g* of the different zones 325 of the vehicle 310 determines which specific doors 330 of the vehicle 310 could be locked because of the moving object 315.

For example, in FIG. 3, the bicyclist 315 is moving toward the vehicle 310 from the rear of the vehicle 310. In this scenario sensor 320*g* in zone 325*f* will first detect the bicyclist 315, then sensor 320*f* in zone 325*e* will detect the bicyclist 315, then sensor 320*e* in zone 325*d* will detect the bicyclist 315, and so on. Since these sensors 320*b*-320*g* and zones 325*a*-325*f* are on the driver's side of the vehicle, the driver's side doors 330 could be locked.

After the analysis is complete, the computer processor determines if a movement threshold has been reached (block 438) the same way as mentioned above for FIG. 4A. If the movement threshold has been reached (block 438) a first signal is sent to the actuator(s) (block 440) of the door lock(s) 335 in the zone(s) 325 of the vehicle 310 where the moving object 315 was detected. This first signal will cause the actuator(s) to automatically lock any unlocked door(s) 330 of the vehicle 310 in the zones 325 where the movement threshold was reached, disable the switches for the door locks 340 to these same doors 330 of the vehicle 310, and notify the vehicle occupants via the speakers 345 or other notification systems, as disclosed above, that certain doors 330 have been automatically locked and certain switches for the door locks 340 have been disabled (block 442) in order to maintain safety inside and outside of the vehicle 310.

If the movement threshold has not been reached (block 438) and the first signal has not been sent (block 444) then no action is taken (block 446). However, if the movement threshold has not been reached (block 438) but the first signal has been sent (block 444) then a second signal is sent to the actuator(s) (block 448) of the door lock(s) 335 in the zone(s) 325 of the vehicle 310 where the first signal was sent. This second signal will cause the actuator(s) to automatically unlock any door(s) 330 that were originally unlocked in the zone(s) 325 where the first signal was sent, enable the use of the switches for the door locks 340 for these same doors 330 for the vehicle occupants, and notify the vehicle occupants via the speakers 345 or other notification systems, as disclosed above, that doors 330 are no longer being automatically locked and the switches for the door locks 340 are re-enabled (block 450).

FIG. 4C shows a flow diagram 460 of a third embodiment of an exemplary computer-implemented method for an automatic door-locking system while a vehicle 310 is stationary. More sophisticated sensors 320b-320g, such as image sensors, can be located around the vehicle 310 instead of motion sensors. The advantage of using image sensors over motion sensors for the detection of motion is that image sensors can determine more characteristics about a moving object other than just whether it is moving and whether it is moving toward the vehicle or not. Image sensors 320b-320g from different zones 325 detect movement of an object 315 (block 462).

The computer processor then receives the image sensor data (block 464) and analyzes the image sensor data (block 466). From the analysis of the image sensor data different characteristics of the moving object 315 are determined (block 468). More particularly, the use of an image sensor allows for different characteristics to be determined because image sensors may collect more data than a motion sensor which allows them to detect more than just motion. Because an image sensor is made up of pixels that each collect their own data frame by frame, changes in pixel data from frame to frame allow for the calculation of characteristics such as the velocity of an object, the distance the object is from the image sensor, the size of the object, and the direction vector of the object. These characteristics include, but are not limited to, the velocity of the object, the distance the object is from the stationary vehicle, the size of the object, and the direction vector of the object. For example, as the moving object 315 gets closer to the vehicle 310, the image (i.e., single frame) may get brighter which indicates that the moving object 315 is closer to the vehicle 310 than it was in the previous image (i.e., previous frame). From this image data, characteristics such as distance and velocity of the moving object 315 can be determined. The analysis of the image sensor data from the image sensors 320b-320g of the different zones 325 of the vehicle 310 determines whether any door 330 of the vehicle 310 should be locked and if so which specific doors 330 of the vehicle 310 could be locked because of the moving object 315.

After the characteristics are determined (block 468), they can be used to determine if there was a false positive (block 470). A false positive could be a small object that is moving very slow and/or erratically. In this case it would have a small size with a slow velocity and/or it is changing directions. For example, an object with these characteristics could be a plastic bag or a leaf floating in the wind. An object such as a plastic bag or a leaf is small in size and is most likely moving erratically (i.e., quickly changing directions) since its motion is dictated by the wind. None of the vehicle doors 330 should lock in this case and a false positive (block 470) would be determined and no action will be taken (block 480).

If no false positive (block 470) is determined, the computer processor determines if a movement threshold has been reached (block 472). If the movement threshold has been reached (block 472) a first signal is sent to the actuator(s) (block 474) of the door lock(s) 335 in the zone(s) 325 of the vehicle 310 where the moving object 315 was detected. This first signal will cause the actuator(s) to automatically lock any unlocked door(s) 330 of the vehicle 310 in the zones 325 where the movement threshold was reached, disable the switches for the door locks 340 to these same doors 330 of the vehicle 310, and notify the vehicle occupants via the speakers 345 or other notification systems, as disclosed above, that certain doors 330 have been automatically locked and certain switches for the door locks 340 have been disabled (block 476) in order to maintain safety inside and outside of the vehicle 310.

If the movement threshold has not been reached (block 472) and the first signal has not been sent (block 478) then no action is taken (block 480). However, if the movement threshold has not been reached (block 472) but the first signal has been sent (block 478) then a second signal is sent to the actuator(s) (block 482) of the door lock(s) 335 in the zone(s) 325 of the vehicle 310 where the first signal was sent. This second signal will cause the actuator(s) to automatically unlock any door(s) 330 that were originally unlocked in the zone(s) 325 where the first signal was sent, enable the use of the switches for the door locks 340 for these same doors 330 for the vehicle occupants, and notify the vehicle occupants via the speakers 345 or other notification systems, as disclosed above, that doors 330 are no longer being automatically locked and the switches for the door locks 340 are re-enabled (block 484).

Exemplary Automatic Emergency Vehicle Alarm System

Figure 5:
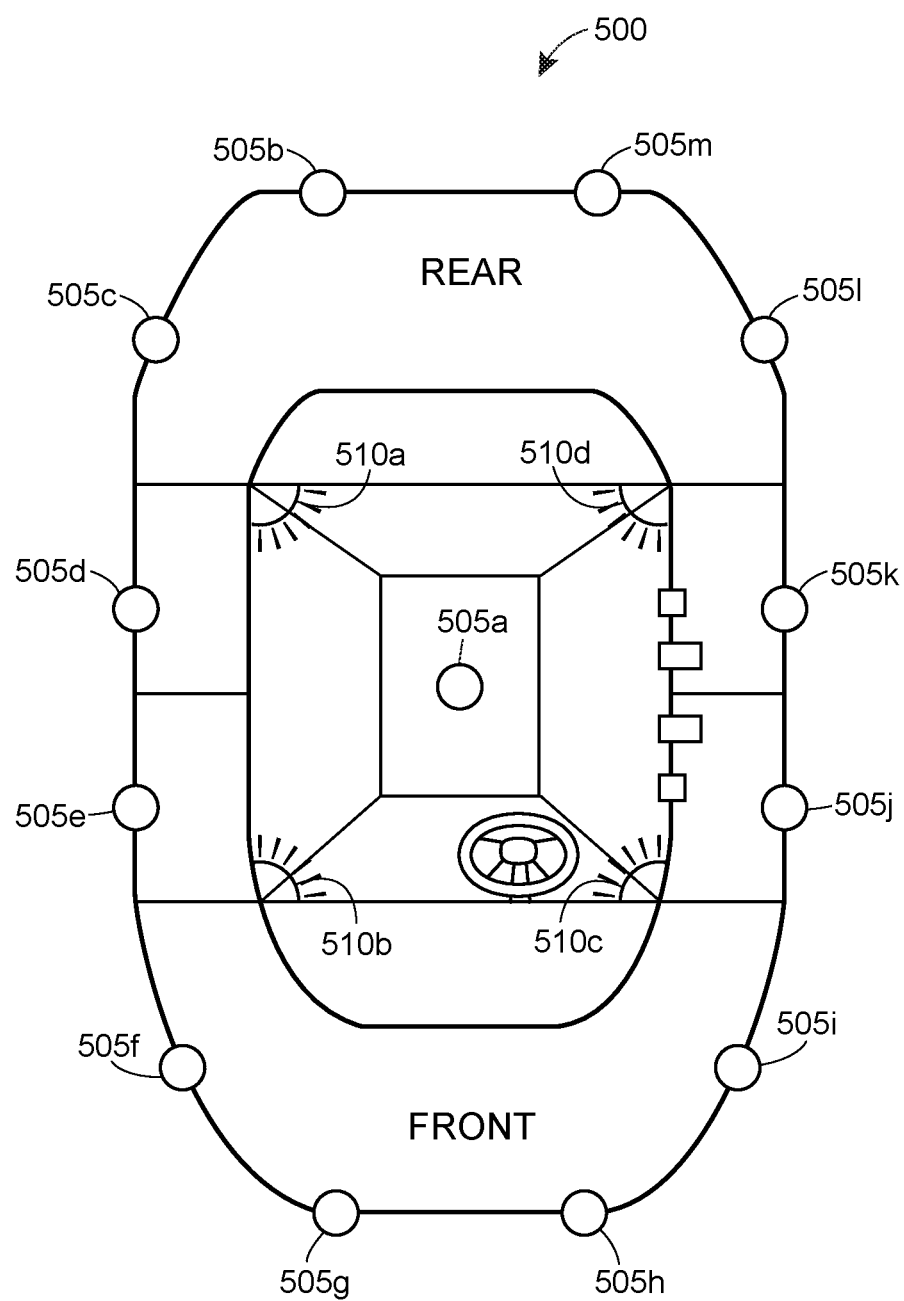
FIG. 5 depicts an exemplary top view of a vehicle with electromagnetic radiation sensors for an automatic emergency vehicle alarm system.

FIG. 5 is a top view of an exemplary vehicle 500 that is equipped with an automatic emergency vehicle alarm system. An emergency vehicle refers to first responding vehicles including, but not limited to, law enforcement vehicles, ambulances, and fire trucks.

The vehicle 500 in FIG. 5 has one or more sensors 505a-505m (collectively referred to as sensors 505) that detect electromagnetic radiation. More specifically, these electromagnetic radiation sensors 505 may detect either frequencies of sound in the human audible range of 20 Hz to 20 Khz or light in the human visible wavelength range of 390 nm to 700 nm. The number of sensors 505 are not limited to the number of sensors 505 shown in FIG. 5, and may be any number of sensors 505, including a single sensor. The vehicle 500 of FIG. 500 otherwise corresponds to the vehicle of FIGS. 1, 2A and 2B.

If a known pattern of electromagnetic data (i.e., a pattern of wavelengths of light and/or frequencies of sound that are particular to an emergency vehicle) is detected by these electromagnetic radiation sensors 505 then an automatic emergency vehicle alarm system is activated and an alarm is sounded from the speakers 510a-510b (collectively referred to as speakers 510) of the vehicle 500 in order to alert the driver of the vehicle 500, as well as any other vehicle occupants, of the presence of an emergency vehicle in the vicinity. A known pattern of electromagnetic data is a pattern of electromagnetic data that is stored in the library of known patterns of electromagnetic data which is discussed below. Although the vehicle 500 depicted in FIG. 7 has four speakers 510, other implementations may have fewer or more speakers 510.

Figure 6A:
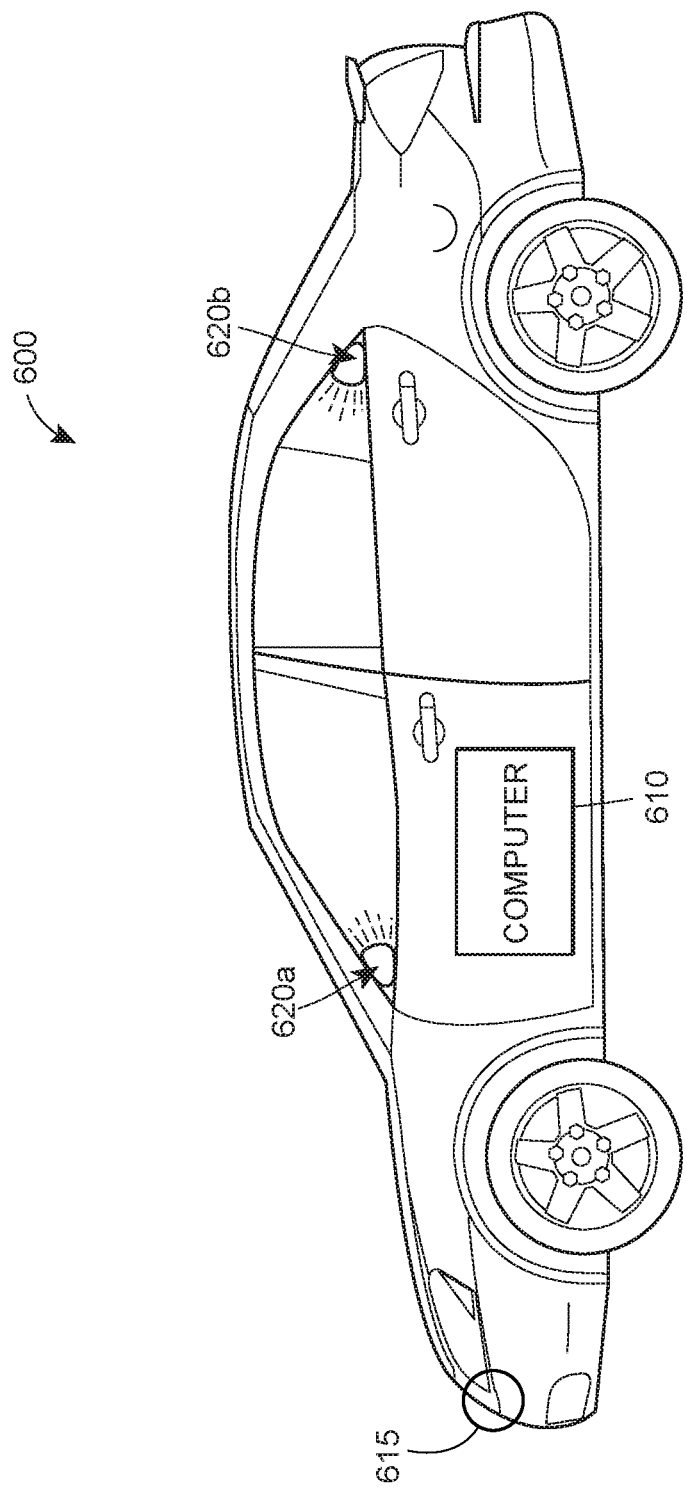
FIG. 6A depicts an exemplary side view of the vehicle with the components of the automatic emergency vehicle alarm system.

FIG. 6A depicts a side view of a vehicle 600 that is the same as the vehicle 500 in FIG. 5, in which the locations of the components of the automatic emergency vehicle alarm system are shown. In this implementation, there is a computer 610 located in the vicinity of the center console of the vehicle 600. A sensor 615 is located in the front of the vehicle. There is one speaker 620a-620b (collectively referred to as speakers 620) each located in the front and back of the vehicle 600.

Figure 6B:
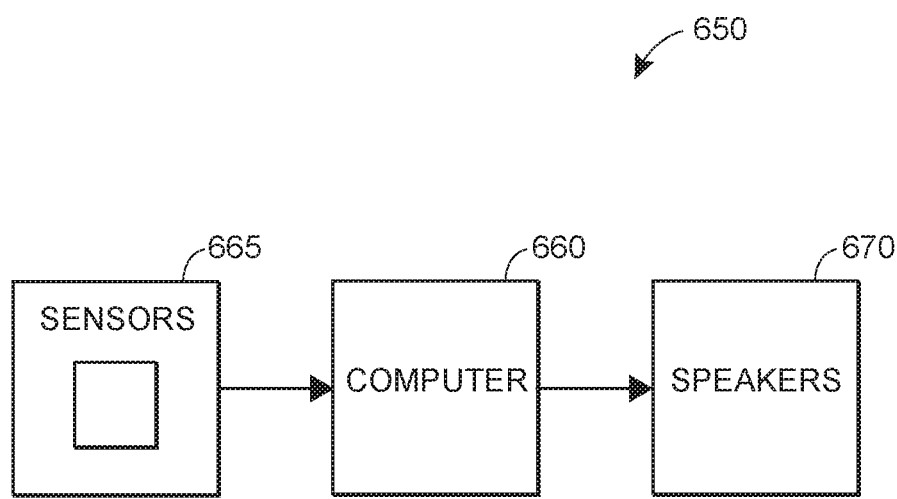
FIG. 6B depicts an exemplary block diagram of the components of the automatic emergency vehicle alarm system.

FIG. 6B depicts a block diagram 650 of the automatic emergency vehicle alarm system depicted in FIG. 6A. The computer 660 used for the automatic emergency vehicle alarm system is the same computer 260 in FIG. 2B used for the automatic door-locking system. This computer 660 has an input and an output. The sensors 665 connect to inputs of the computer 660. The sensors 665 send signals to the computer 660 and the computer 660 analyzes the signals to determine if the automatic emergency vehicle alarm should be activated. The computer 660 has outputs to the speakers 670. The speakers 670 are also the same speakers 280 in FIG. 2B. Based upon the signals the computer 660 receives from the sensors 665, the computer 660 sends signal to the speakers 670 to either activate or deactivate the emergency vehicle alarm.

Figure 7:
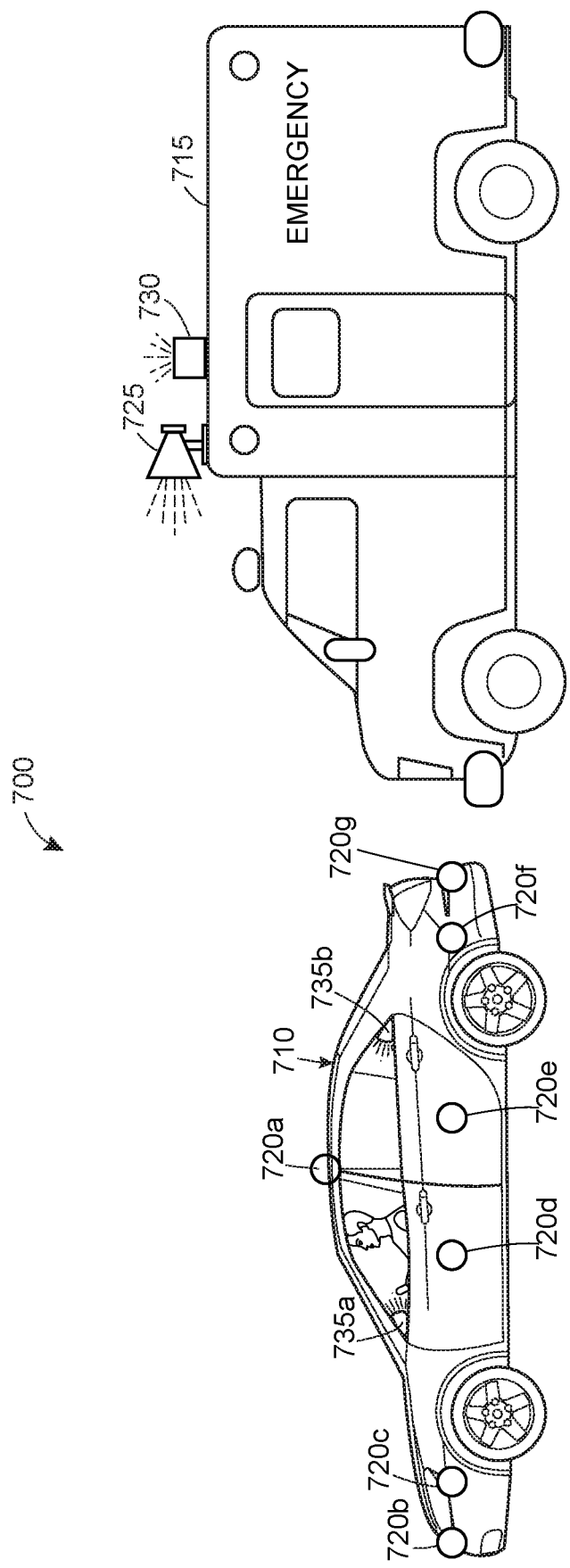
FIG. 7 depicts an exemplary side view of the vehicle, with electromagnetic radiation sensors, and an emergency vehicle moving toward the vehicle.
Figure 8:
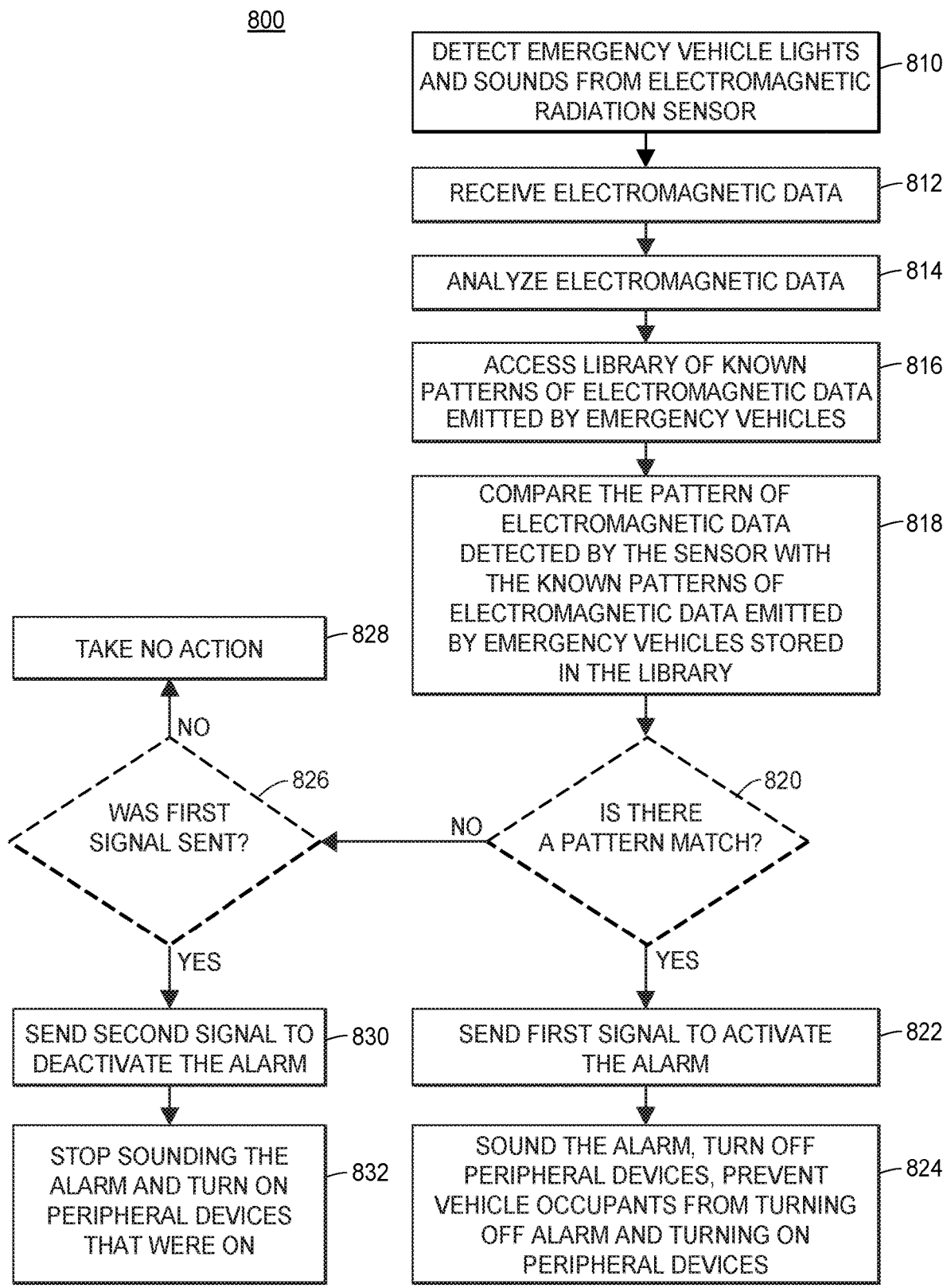
FIG. 8 depicts an exemplary computer-implemented method for an automatic emergency vehicle alarm system.

FIG. 7 is an exemplary scenario 700 with the driver's side view of a vehicle 710 and an emergency vehicle 715 that will be used to explain the method flow diagram of FIG. 8. In this implementation, the vehicle 700 and emergency vehicle 715 could be moving or stationary. The emergency siren 725 and emergency lights 730 are both activated as they would in the case of an emergency.

There may be a sensor 720a located on the top of the vehicle 710 and several sensors 720b-720g located on the side of the vehicle 710. There may also be one speaker 735a-735b (collectively referred to as speakers 735) each located in the front and back of the vehicle 710.

FIG. 8 shows a flow diagram 800 of an exemplary computer-implemented method for an automatic emergency vehicle alarm system. An electromagnetic radiation sensor 720 detects the emergency lights 730 and/or emergency sounds 725 from an emergency vehicle 715 (block 610). The electromagnetic radiation sensors 720 detect frequencies of sound in the human audible range of 20 Hz to 20 Khz and light in the human visible wavelength range of 390 nm to 700 nm. It is important to detect both the lights and the sounds of the emergency vehicle individually and together because sometimes emergency vehicles are only using the emergency siren or only the emergency lights in the event of an emergency or sometimes both.

The computer processor then receives the electromagnetic data (block 812) and analyzes the electromagnetic data (block 814) to determine any patterns of electromagnetic data. After the electromagnetic data is analyzed, the computer processor will access a library of known patterns of electromagnetic data emitted by emergency vehicles (block 816). The patterns of electromagnetic data detected by the electromagnetic radiation sensor 720 are then compared with the known patterns of electromagnetic data emitted by emergency vehicles stored in the library (block 818). Emergency vehicles may emit a repeating pattern of electromagnetic data or random patterns of electromagnetic data. Additionally, different jurisdictions throughout the country use different types of patterns of electromagnetic data. Therefore the library of known patterns of electromagnetic data contains many different patterns of electromagnetic data that may be matched with the electromagnetic data emitted by emergency vehicles all over the country.

If there is a match (block 820) between the patterns of electromagnetic data detected by the electromagnetic radiation sensor 720 and the known patterns of electromagnetic data emitted by emergency vehicles stored in the library then a first signal is sent to activate the alarm (block 822). The speakers 735 will then sound the alarm, any peripheral devices (e.g., AM/FM radio, satellite radio, Bluetooth, WiFi, CD player, cassette player, auxiliary input(s), or USB input(s)) that are on may be turned off, and the vehicle occupants may be prevented from turning on any peripheral devices (block 824). For example, if the vehicle occupants are listening to the AM/FM radio of the vehicle 710 and there is an ambulance in the vicinity and it is deemed that an emergency vehicle has been detected, then the speakers 735 of the vehicle 710 will sound the alarm the AM/FM radio will turn off in order to alert the vehicle occupants that there is an emergency vehicle in the vicinity.

If there is no match (block 820) between the patterns of electromagnetic data detected by the electromagnetic radiation sensor and the known patterns of electromagnetic data emitted by emergency vehicles stored in the library and the first signal has not been sent (block 826) then no action is taken (block 828). However, if there is no match (block 820) between the pattern of electromagnetic data detected by the electromagnetic radiation sensor 720 and the known patterns of electromagnetic data emitted by emergency vehicles stored in the library but the first signal has been sent (block 826) then a second signal is sent to deactivate the alarm (block 830). The speakers 735 will then stop sounding the alarm and the peripheral devices that were turned on before the first signal was sent will be turned back on (block 832). In the case that the only pattern of electromagnetic data detected was audio data, the second signal can be sent to deactivate the alarm if the decibel level of this audio electromagnetic data falls below a predetermined value.

Exemplary Embodiments for On-Board Vehicle Computer System

Figure 9:
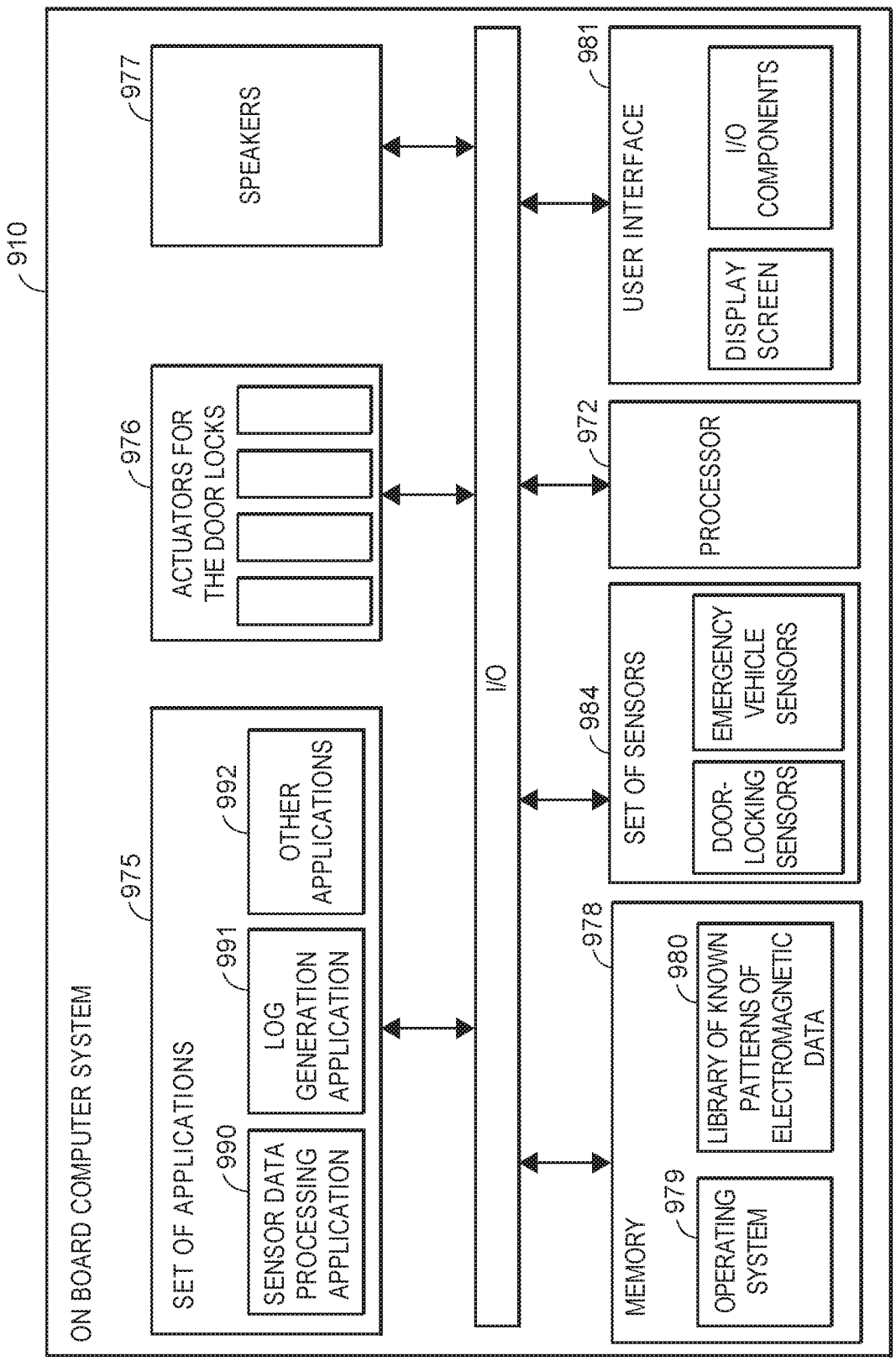
FIG. 9 depicts a block diagram of the on-board computer system for the automatic door-locking system and the automatic emergency vehicle alert or alarm system.

FIG. 9 illustrates a diagram of an exemplary on-board vehicle computer system 910 in which the functionalities herein may be implemented. In some implementations, the on-board vehicle computer system 910 may be a mobile electronic device and/or may be included as part of a remote server.

The on-board vehicle computer system 910 may include a processor 972 as well as a memory 978. The memory 978 may store an operating system 979 capable of facilitating the functionalities as discussed herein as well as a set of applications 975 (i.e., machine readable instructions). For example, one of the set of applications 975 may be a sensor data processing application 990 configured to analyze the sensor data from the automatic door-locking sensors to identify moving objects (execute methods disclosed in FIGS. 4A-4C) in the immediate vicinity of the stationary vehicle and the automatic emergency vehicle alarm sensors to identify emergency vehicles in the vicinity of the vehicle (execute methods disclosed in FIG. 8).

Also in the set of applications 975 is a log generation application 991 configured to generate a log of incidents in which one or more doors were automatically locked due to a moving object in the immediate vicinity of the stationary vehicle and an alarm is activated due to the presence of an emergency vehicle in the vicinity of the vehicle. Additionally, it should be appreciated that one or more other applications 992 are envisioned.

The processor 972 may interface with the memory 978 to execute the operating system 979 and the set of applications 975. According to some embodiments, the memory 978 may also include a library of known patterns of electromagnetic data emitted by emergency vehicles 980. In some implementations, the sensor data processing application 990 may interface with the library of known patterns of electromagnetic data emitted by emergency vehicles 980 to retrieve library of known patterns of electromagnetic data emitted by emergency vehicles 980 in order to compare it with the processed sensor data. The memory 978 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The on-board vehicle computer system 910 may further communicate with actuators for the door locks 976 and speakers 977. The communication between the on-board vehicle computer system 910 and the actuators for the door locks 976 consists of the on-board computer system 910 sending signals to automatically lock or unlock one or more doors of the stationary vehicle. The communication between on-board vehicle computer system 910 and the speakers 977 consists of the on-board vehicle computer system 910 sending signals to automatically activate or deactivate an alarm.

The on-board vehicle computer system 910 may further include a set of sensors 984. The processor 972 and the set of applications 975 may interface with the set of sensors 984 to retrieve and process the corresponding sensor data. The set of sensors 984 may include one or more automatic door-locking sensors 985 and one or more automatic emergency vehicle alarm sensors 986. In one particular implementation, the log generation application 991 may use various data from the set of sensors 984 to generate logs of recorded movements. Further, in one implementation, the on-board vehicle computer system 910 may interface with one or more automatic door-locking sensors and automatic emergency vehicle alarm sensors that may be external to the on-board vehicle computer system 910.

The on-board vehicle computer system 910 may further include a user interface 981 configured to present information to a user and/or receive inputs from the user. As shown in FIG. 9, the user interface 981 may include a display screen 982 and I/O components 983 (e.g., ports, capacitive or resistive touch sensitive input panels, keys, buttons, lights, LEDs, speakers, microphones). According to some embodiments, the user may access the on-board computer system 910 via the user interface 981 to review information and/or perform other functions. In some embodiments, the on-board vehicle computer system 910 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 972 (e.g., working in connection with the operating system 979) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the preceding texts set forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Machine Learning and Other Matters

In certain embodiments, the machine learning techniques, such as cognitive learning, deep learning, combined learning, heuristic engines and algorithms, and/or pattern recognition techniques. For instance, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, insurer database, and/or third-party database data, including the historical auto insurance claim data discussed herein. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more user device details, user request or login details, user device sensors, geolocation information, image data, the insurer database, a third-party database, and/or other data.

In one embodiment, a processing element (and/or machine learning or heuristic engine or algorithm discussed herein) may be trained by providing it with a large sample of images and/or user data with known characteristics or features, such as historical vehicle data and/or past auto claim data. Based upon these analyses, the processing element may learn how to identify characteristics and patterns that may then be applied to analyzing user device details, user vehicle details, user device sensors, geolocation information, image data, the insurer database, a third-party database, and/or other data. For example, the processing element may learn, with the user's permission or affirmative consent, to identify the user and/or insured vehicles, and/or learn to identify insured vehicles characteristics.

Exemplary Method Embodiments

In one aspect, a computer-implemented method for automatically locking the doors of a vehicle may be provided. The method may include, via one or more processors, sensors, and/or transceivers: (1) receiving sensor data from a sensor located on the exterior of the vehicle when the vehicle is stationary; (2) analyzing the sensor data to identify movement of objects in the immediate vicinity exterior to the vehicle while the vehicle is stationary; (3) determining, based upon the analyzing, if a movement threshold value for objects exterior to the vehicle has been reached; and/or (4) activating an automatic door-locking mechanism when the outcome of the data analysis is over the movement threshold resulting in the computer processor sending a first signal to activate an actuator to lock a door of the vehicle. The method may include additional, less, or alternate actions, including that discussed elsewhere herein.

For instance, the method may further include receiving sensor which comprises receiving data from a plurality of sensors. The sensor data is received from one of a plurality of zones exterior to the vehicle wherein each zone is assigned one or more door locks of the vehicle.

The method may further include analyzing the sensor data which is comprised of calculating the velocity of the object, the distance the object is from the stationary vehicle, the size of the object, and the direction vector of the object.

The method may further include determining if a movement threshold value for objects exterior to the vehicle has been reached which is comprised of determining a movement threshold that is based upon the velocity of the object, the distance the object is from the stationary vehicle, and the direction vector of the object.

The method may further include defining the movement threshold of an object which is comprised of an object that has a non-zero velocity, that is moving in a direction towards the vehicle, and that is at a certain maximum distance away or less from the vehicle.

The method may further include activating an automatic door-locking system comprising: (1) sending the first signal to at least one zone in order to automatically lock one or more door locks that are unlocked if the outcome of the data analysis is over the movement threshold; (2) disabling one or more switches for door locks in order to prevent one or more vehicle occupants from unlocking any locked doors that are in the zones affected by the outcome of the data analysis being over the movement threshold; and/or (3) notifying vehicle occupants via the vehicle speakers and/or other possible forms of notification (e.g., haptic feedback in the seat or steering wheel, flashing light, on screen display notification, heads-up display notification, audible alert or alarm, etc.) that certain doors have been automatically locked and certain switches for the door locks have been disabled in order to maintain safety inside and outside of the vehicle.

The method may further include: (1) continuing to receive data from the sensor; (2) continuing to analyze the data from the sensor to determine whether the movement threshold is being met; (3) sending a second signal to at least one zone in order to automatically unlock one or more door locks that were originally unlocked prior to when the threshold value was reached if the outcome of the data analysis falls below the movement threshold; (4) enabling the use of the switches for the door locks; and/or (5) notifying the vehicle occupants via the vehicle speakers and/or other possible forms of notification (e.g., haptic feedback in the seat or steering wheel, flashing light, on screen display notification, heads-up display notification, audible alert or alarm, etc.) that doors are no longer being automatically locked and the switches for the door locks are re-enabled.

In another aspect, a computer-implemented method for an automatic alarm system for a vehicle may be provided. The method may include, via one or more processors, sensors, and/or transceivers: (1) receiving sensor data from a sensor located on the exterior of the vehicle; (2) analyzing the sensor data to identify the electromagnetic data exterior to the vehicle; (3) accessing a library of known patterns of electromagnetic data emitted by emergency vehicles; (4) comparing the pattern of electromagnetic data detected by the sensor with the patterns of electromagnetic data emitted by emergency vehicles stored in the library; (5) determining, based upon the comparing, if there is a match between the pattern of electromagnetic data detected by the sensor and the known patterns of electromagnetic data emitted by emergency vehicles stored in the library; and/or (6) activating an automatic alarm mechanism when the outcome of the comparison matches a known pattern of electromagnetic data emitted by an emergency vehicle resulting in the computer processor sending a first signal to activate and alarm. The method may include additional, less, or alternate actions, including those discussed elsewhere herein.

For instance, the method may further include receiving sensor data which is comprised of receiving data from a plurality of sensors which further comprises: (1) receiving electromagnetic data in the visible wavelength range from 390 nm to 700 nm; and/or (2) receiving electromagnetic data in the audible frequency range from 20 Hz to 20 KHz.

The method may further include analyzing the sensor data to identify patterns of electromagnetic data exterior to the vehicle which is comprised of: (1) determining the wavelengths of the electromagnetic data that are within the visible range (390 nm to 700 nm); and/or (2) determining the frequencies of the electromagnetic data that are within the audible range (20 Hz to 20 KHz).

The method may include accessing a library of known patterns of electromagnetic data which is comprised of retrieving electromagnetic data emitted by emergency vehicles. The method may further include comparing the pattern of electromagnetic data detected by the sensor with the known patterns of electromagnetic data emitted by emergency vehicles stored in the library which is comprised of determining if there is a match between the electromagnetic data detected by the sensor with the known electromagnetic data emitted by emergency vehicles stored in the library.

The method may further include activating an automatic alarm mechanism when the outcome of the comparison matches a known pattern of electromagnetic data emitted by an emergency vehicle resulting in the computer processor sending a signal to activate the alarm comprising: (1) sending a first signal to activate the alarm if the outcome of the data analysis matches a known pattern of electromagnetic data; (2) turning off one or more peripheral devices; and/or (3) preventing one or more vehicle occupants from turning off the alarm if the outcome of the data analysis matches a known pattern of electromagnetic data.

The method may further include: (1) continuing to receive electromagnetic data from the sensor; (2) continuing to analyze the electromagnetic data from the sensor to determine whether the movement threshold is being met; (3) sending a second signal to deactivate the alarm if the outcome of the data analysis no longer matches a known pattern and frequency of lights and sounds; and/or (4) turning on one or more peripheral devices were turned off when the alarm was activated.

Exemplary Computer Systems & Computer-Implemented Methods

In one aspect, a computer system configured for an automatic door-locking system for a vehicle may be provided. The computer system may include one or more local or remote processors, servers, sensors, and/or transceivers configured to: (1) detect the movement of objects in the immediate vicinity exterior to the vehicle while the vehicle is stationary, wherein the immediate vicinity comprises the area surrounding the vehicle including the width of the doors when they are fully opened; (2) receive data from the sensor; (3) analyze the data from the sensor to determine if a movement threshold of an object has been reached; and/or (4) activate an automatic door-locking mechanism when an outcome of the data analysis is over the movement threshold resulting in the computer processor sending a first signal to activate an actuator to lock an unlocked door of the vehicle. The system may include additional, less, or alternate functionality, including that discussed elsewhere herein.

For instance, the system may be further configured to use a plurality of sensors adapted to detect the movement of objects in the immediate vicinity exterior to the vehicle while the vehicle is stationary, wherein immediate vicinity exterior to the vehicle is comprised of a plurality of zones with each zone assigned to one or more door locks of the vehicle, wherein each zone is comprised of at least one sensor and the field-of-view of the sensor defines the zone.

The system may be further configured to: (1) calculate, from the sensor data, the velocity of the object, the distance the object is from the stationary vehicle, the size of the object, and the direction vector of the object; and/or (2) determine a movement threshold that is based upon the velocity of the object, the distance the object is from the stationary vehicle, and the direction vector of the object, wherein the movement threshold of an object comprises an object that has a non-zero velocity, is moving in a direction towards the vehicle, and is at a certain maximum distance away or less from the vehicle.

The system may be further configured to: (1) send the first signal to the actuators that control the door locks in the one or more zones that the moving object was detected in order to automatically lock one or more door locks that are unlocked if the outcome of the data analysis is over the movement threshold; and/or (2) disable one or more switches for the door locks in order to prevent one or more vehicle occupants from unlocking any locked doors that were locked as a result of the outcome of the data analysis being over the movement threshold; (3) notify vehicle occupants via the vehicle speakers and/or other possible forms of notification (e.g., haptic feedback in the seat or steering wheel, flashing light, on screen display notification, heads-up display notification, audible alert or alarm, etc.) that certain doors have been automatically locked and certain switches for the door locks have been disabled in order to maintain safety inside and outside of the vehicle.

The system may be further configured to: (1) continue to receive data from the sensor; (2) continue to analyze the data from the sensor to determine whether the movement threshold has been reached; (3) send a second signal to at least one zone in order to automatically unlock one or more locked door locks that were originally unlocked prior to when the threshold value was reached if the outcome of the data analysis falls below the movement threshold; (4) enable the use of the switches for the door locks; and/or (5) notify the vehicle occupants via the vehicle speakers and/or other possible forms of notification (e.g., haptic feedback in the seat or steering wheel, flashing light, on screen display notification, heads-up display notification, audible alert or alarm, etc.) that doors are no longer being automatically locked and the switches for the door locks are re-enabled.

In another aspect, a computer system configured for an automatic alarm system for a vehicle may be provided. The computer system may include one or more local or remote processors, servers, sensors, and/or transceivers configured to: (1) receive data from the sensor; (2) analyze the data from the sensor to determine if a pattern from the electromagnetic data has been detected; (3) access a library of known patterns of electromagnetic data emitted by emergency vehicles; (4) compare the pattern of electromagnetic data detected by the sensor with the known patterns of electromagnetic data emitted by emergency vehicles that are stored in the library; and/or (5) activate an automatic alarm mechanism in response to the processor determining that the comparison matches a known pattern of electromagnetic data for an emergency vehicle resulting in the computer processor sending a first signal to activate an alarm. The system may include additional, less, or alternate functionality, including that discussed elsewhere herein.

The system may be further configured to: (1) detect audible frequencies in the 20 Hz to 20 KHz range; (2) detect visible wavelengths in the 390 nm to 700 nm range. The system may be further configured to use a sensor in which the sensor comprises a plurality of sensors.

The system may be further configured to use a plurality of sensors which are comprised of different types of sensors adapted to: (1) detect audible frequencies in the 20 Hz to 20 KHz range; and/or (2) detect visible wavelengths in the 390 nm to 700 nm range. The system may be further configured to: (1) detect specific wavelengths and patterns of light in the visible range (390 nm to 700 nm); and/or (2) detect specific frequencies and patterns of sound in the audible range (20 Hz to 20 KHz).

The system may be further configured to: (1) send a first signal to activate the alarm if the outcome of the data analysis matches a known pattern of electromagnetic data; (2) turn off one or more peripheral devices. The system may be further configured to have one or more peripheral devices that comprise, but are not limited to, the following: AM/FM radio, satellite radio, Bluetooth, WiFi, CD player, cassette player, auxiliary input(s), or USB input(s).

The system may be further configured to: (1) continue to receive data from the sensor; (2) continue to analyze the data from the sensor to determine if the outcome of the data analysis matches a known pattern of electromagnetic data; (3) send a second signal to deactivate the alarm if the outcome of the data analysis no longer matches a known pattern of electromagnetic data; and/or (4) turn on one or more peripheral devices that were turned off when the alarm was activated. The system may be further configured to send a second signal to deactivate the alarm if the electromagnetic audio data drops below a certain decibel level.

Additional Considerations

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f). The patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to an improvement to computer functionality, and improve the functioning of conventional computers" or the like.

What is claimed:

1. An automatic alarm system of a vehicle comprising:
    a sensor adapted to detect electromagnetic data;
    a computer system adapted to:
        receive data from the sensor;
        analyze, by a computer processor, the data from the sensor to determine whether a pattern from the electromagnetic data has been detected;
        access, by the computer processor, a library of known patterns of electromagnetic data emitted by emergency vehicles;
        compare, by the computer processor, the pattern of electromagnetic data detected by the sensor with the known patterns of electromagnetic data emitted by emergency vehicles that are stored in the library; and
    an automatic alarm mechanism that activates in response to the processor determining that the comparison matches a known pattern of electromagnetic data for an emergency vehicle resulting in the computer processor sending a first signal to activate an alarm of the vehicle.

2. The system of claim 1, wherein the sensor is adapted to: detect audible frequencies in the 20 Hz to 20 KHz range.

3. The system of claim 1, wherein the sensor is adapted to: detect visible wavelengths in the 390 nm to 700 nm range.

4. The system of claim 1, wherein the sensor comprises a plurality of sensors adapted to detect electromagnetic data.

5. The system of claim 4, wherein the plurality of sensors are comprised of different types of sensors adapted to:
    detect audible frequencies in the 20 Hz to 20 KHz range; and
    detect visible wavelengths in the 390 nm to 700 nm range.

6. The system of claim 1, wherein the sensor is adapted to:
    detect specific wavelengths and patterns of light in the visible range (390 nm to 700 nm); and
    detect specific frequencies and patterns of sound in the audible range (20 Hz to 20 KHz).

7. The system of claim 1, wherein the computer processor is adapted to:
    send a first signal to activate the alarm if the outcome of the data analysis matches a known pattern of electromagnetic data; and
    turn off one or more peripheral devices.

8. The system of claim 7, wherein the one or more peripheral devices comprise, but are not limited to, the following:
    AM/FM radio, satellite radio, Bluetooth, WiFi, CD player, cassette player, auxiliary input(s), or USB input(s).

9. The system of claim 7, wherein the computer processor is further adapted to:
    continue to receive data from the sensor;
    continue to analyze the data from the sensor to determine whether the outcome of the data analysis matches a known pattern of electromagnetic data;
    send a second signal to deactivate the alarm if the outcome of the data analysis no longer matches a known pattern of electromagnetic data; and
    turn on one or more peripheral devices that were turned off when the alarm was activated.

10. The system of claim 9, wherein the computer processor is further adapted to:
    send a second signal to deactivate the alarm if the electromagnetic audio data drops below a predetermined decibel level.

11. A method implemented by an automatic alarm system of a vehicle, the method comprising:
    detecting electromagnetic data using a sensor;
    receiving, by a computer system, data from the sensor;
    analyzing, by a computer processor, the data from the sensor to determine whether a pattern from the electromagnetic data has been detected;
    accessing, by the computer processor, a library of known patterns of electromagnetic data emitted by emergency vehicles;
    comparing, by the computer processor, the pattern of electromagnetic data detected by the sensor with the known patterns of electromagnetic data emitted by emergency vehicles that are stored in the library; and
    activating an automatic alarm mechanism in response to the computer processor determining that the comparison matches a known pattern of electromagnetic data for an emergency vehicle, at least in part by the computer processor sending a first signal to activate an alarm of the vehicle.

12. The method of claim 11 wherein the sensor is adapted to:
    detect audible frequencies in the 20 Hz to 20 KHz range.

13. The method of claim 11, wherein the sensor is adapted to:
    detect visible wavelengths in the 390 nm to 700 nm range.

14. The method of claim 11, wherein the sensor comprises a plurality of sensors adapted to detect electromagnetic data.

15. The method of claim 14, wherein the plurality of sensors are comprised of different types of sensors adapted to:

detect audible frequencies in the 20 Hz to 20 KHz range; and detect visible wavelengths in the 390 nm to 700 nm range.

16. The method of claim 11, wherein the sensor is adapted to:
   detect specific wavelengths and patterns of light in the visible range (390 nm to 700 nm); and
   detect specific frequencies and patterns of sound in the audible range (20 Hz to 20 KHz).

17. The method of claim 11, wherein:
   the method further comprises sending, by the computer processor, the first signal to activate the alarm if the outcome of the data analysis matches a known pattern of electromagnetic data; and
   the method comprises turning off, by the computer processor, one or more peripheral devices.

18. The method of claim 17, wherein the one or more peripheral devices comprise, but are not limited to, the following:
   AM/FM radio, satellite radio, Bluetooth, WiFi, CD player, cassette player, auxiliary input(s), or USB input(s).

19. The method of claim 17, wherein the method further comprises:
   continuing, by the computer processor, to receive data from the sensor;
   continuing, by the computer processor, to analyze the data from the sensor to determine whether the outcome of the data analysis matches a known pattern of electromagnetic data;
   sending, by the computer processor, a second signal to deactivate the alarm if the outcome of the data analysis no longer matches a known pattern of electromagnetic data; and
   turning on, by the computer processor, one or more peripheral devices that were turned off when the alarm was activated.

20. The method of claim 19, wherein the method further comprises:
   sending, by the computer processor, a second signal to deactivate the alarm if the electromagnetic audio data drops below a predetermined decibel level.

* * * * *